US011141655B2

(12) United States Patent
Oono

(10) Patent No.: US 11,141,655 B2
(45) Date of Patent: *Oct. 12, 2021

(54) GAME CONTROL METHOD, GAME CONTROL DEVICE, AND RECORDING MEDIUM

(71) Applicant: GREE, Inc., Tokyo (JP)

(72) Inventor: Kazuki Oono, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,937

(22) Filed: Jan. 22, 2021

(65) Prior Publication Data

US 2021/0138341 A1 May 13, 2021

Related U.S. Application Data

(60) Continuation of application No. 16/822,178, filed on Mar. 18, 2020, now Pat. No. 10,926,168, which is a (Continued)

(30) Foreign Application Priority Data

Mar. 12, 2013 (JP) ................................ 2013-049388
Sep. 27, 2013 (JP) ................................ 2013-202682
Dec. 19, 2013 (JP) ................................ 2013-262855

(51) Int. Cl.
*A63F 13/46* (2014.01)
*A63F 13/31* (2014.01)
(Continued)

(52) U.S. Cl.
CPC .............. *A63F 13/31* (2014.09); *A63F 13/44* (2014.09); *A63F 13/49* (2014.09); *A63F 13/58* (2014.09);
(Continued)

(58) Field of Classification Search
CPC .......... A63F 13/40; A63F 13/44; A63F 13/45; A63F 13/46; A63F 13/48; A63F 13/50;
(Continued)

(56) References Cited

U.S. PATENT DOCUMENTS 4,856,787 A   8/1989   Itkis
5,816,918 A   10/1998  Kelly et al.
(Continued)

FOREIGN PATENT DOCUMENTS

JP   H11-244533    9/1999
JP   2009-119030   6/2009
(Continued)

OTHER PUBLICATIONS

IPR2020-01628; U.S. Pat. No. 9,561,439, Patent Owner's Sur-Reply to Petitioner's Reply to Patent Owner's Preliminary Response (dated Jan. 19, 2021) 14 pages.
(Continued)

*Primary Examiner* — Omkar A Deodhar
(74) *Attorney, Agent, or Firm* — Oblon, McClelland, Maier & Neustadt, L.L.P.

(57) ABSTRACT

Provided is a game control method carried out by a game control device connected to communication terminals used by users who play a game. The device has a storage unit for storing group information indicative of a group consisting of users and game piece information indicative of game pieces constituting one item. The method includes giving a game piece to each user in accordance with a user operation to his/her communication terminal; storing obtained game piece information indicative of the game piece given to each user in the storage unit; determining whether all of the game pieces necessary to constitute the one item indicated by the game piece information are given to users constituting a group indicated by the group information based on the
(Continued)

obtained game piece information; and giving a reward to users constituting the group if it is determined that all of the game pieces are given.

24 Claims, 12 Drawing Sheets

Related U.S. Application Data continuation of application No. 16/667,073, filed on Oct. 29, 2019, now Pat. No. 10,632,373, which is a continuation of application No. 15/784,483, filed on Oct. 16, 2017, now Pat. No. 10,507,389, which is a continuation of application No. 15/389,065, filed on Dec. 22, 2016, now Pat. No. 9,827,491, which is a continuation of application No. 14/735,958, filed on Jun. 10, 2015, now Pat. No. 9,561,439, which is a division of application No. 14/198,411, filed on Mar. 5, 2014, now Pat. No. 9,079,107.

(51) Int. Cl.
| A63F 13/795 | (2014.01) |
| A63F 13/822 | (2014.01) |
| A63F 13/58 | (2014.01) |
| A63F 13/44 | (2014.01) |
| A63F 13/49 | (2014.01) |
| A63F 13/792 | (2014.01) |
| A63F 13/798 | (2014.01) |

(52) U.S. Cl.
CPC .......... *A63F 13/792* (2014.09); *A63F 13/795* (2014.09); *A63F 13/798* (2014.09); *A63F 13/822* (2014.09)

(58) Field of Classification Search
CPC ...... A63F 13/52; A63F 13/533; A63F 13/537; A63F 13/55; A63F 13/56; A63F 13/58; A63F 13/69; A63F 13/70; A63F 13/77; A63F 13/79; A63F 13/795; A63F 13/798; A63F 13/822; A63F 13/825; A63F 13/847
See application file for complete search history.

(56) References Cited

U.S. PATENT DOCUMENTS

| 7,824,253 | B2 | 11/2010 | Thompson et al. |
| 8,376,838 | B2 | 2/2013 | Schulhof et al. |
| 9,079,107 | B2 | 7/2015 | Oono |
| 2004/0143852 | A1 | 7/2004 | Meyers |
| 2007/0219001 | A1 | 9/2007 | Mueller |
| 2009/0201299 | A1 | 8/2009 | Bhogal et al. |
| 2011/0124415 | A1 | 5/2011 | Shimono |
| 2011/0300926 | A1 | 12/2011 | Englman et al. |
| 2012/0071245 | A1 | 3/2012 | Kotkin et al. |
| 2012/0157212 | A1 | 6/2012 | Kane et al. |
| 2013/0143669 | A1 | 6/2013 | Muller |
| 2013/0190094 | A1 | 7/2013 | Ronen et al. |
| 2014/0024462 | A1 | 1/2014 | Qiang et al. |
| 2014/0038716 | A1 | 2/2014 | Endo |
| 2014/0274401 | A1 | 9/2014 | Oono |

FOREIGN PATENT DOCUMENTS

| JP | 2011-110139 | 6/2011 |
| JP | 2013-27477 | 2/2013 |
| JP | 2014-171800 | 9/2014 |

OTHER PUBLICATIONS

IPR2020-01633; U.S. Pat. No. 9,079,107; Patent Owner's Sur-Reply to Petitioner's Reply to Patent Owner's Preliminary Response (dated Jan. 19, 2021) 12 pages.
IRP2020-01633 (Paper 7); U.S. Pat. No. 9,079,107; Petitioner's Reply to Patent Owner's Preliminary Response (dated Jan. 12, 2021) 12 pages.
IPR-2020-01628 (Paper 7); U.S. Pat. No. 9,561,439; Petitioner's Reply to Patent Owner's Preliminary Response (dated Jan. 12, 2021) 14 pages.
Expert Report of Jose' Zagal, Civil Action No. 2:19-cv-000311-JRG-RSP (Nov. 2, 2020) 390 pages.
Rebuttal Expert Report of Dr. Robert Aki; Civil Action No. 2:19-cv-000311-JRG-RSP (Nov. 24, 2020) 112 pages.
IPR2020-01628; U.S. Pat. No. 9,561,439; Patent Owner's Preliminary Response (dated Dec. 28, 2020) 61 pages.
IPR-01633; U.S. Pat. No. 9,079,107; Patent Owner's Preliminary Response (dated Dec. 28, 2020) 55 pages.
Office Action dated Jan. 5, 2021 in counterpart Japanese Application No. 2019-214143, along with an English translation.
Fagi mobage Express 2011 Summer, Fagi mobage vol. 2, Inc., Jul. 21, 2011, vol. 2.
Wishes, Lineage II [online],2013, Jan. I, 2013, Jan. I, 2019 ; Search on Mar. 5, ; URL,https://web.archive.org/web/20130101054625/ https://event2.ncsoft.jp/1.0/lineage2/1212kaliel / mouse.
IPR2020-01633 Exhibit 1008: World of Warcraft, Guild Advancement and You, (Jan. 21, 2011), https://worldofwarcraft.com/en-us/news/2113741/guild-advancement-and-you.
IPR2020-01633 Exhibit 1009: Arc Games, Forsaken World—Overview—Guild Contribution, (Mar. 29, 2011), https://www.arcgames.com/en/games/forsaken-world/news/detail/1077620-forsaken-world-_-free-mmorpg-_-overview-_-guild-contribution.
IPR2020-01633 Exhibit 1010: MMORPG, Divina—Unique Guild System, (May 12, 2012), https://www.mmorpg.com/divina/developer-journals/unique-guild-domain-system-2000093507.
IPR2020-01633 Exhibit 1003: Declaration of Emmet J. Whitehead, Jr., Ph.D. in Support of Petition for Inter Partes Review of U.S. Pat. No. 9,079,107.
IPR2020-01633 Paper No. 1: Petition for Inter Partes Review of U.S. Pat. No. 9,079,107.
IPR2020-01628 Exhibit 1003: Declaration of Emmet J. Whitehead, Jr., Ph.D. in Support of Petition for Inter Partes Review of U.S. Pat. No. 9,561,439.
IPR2020-01628 Paper No. 1 Petition for Inter Partes Review of U.S. Pat. No. 9,561,439.
Supercell OY, Invalidity Contentions and Disclosures (19-00311) dated Apr. 7, 2020, Civil Action No. 2:19-cv-00311-JRG, 20 pages.
Preliminary Ineligibility Contentions U.S. Pat. No. 9,079,107 to Oono (19-00311) dated Apr. 7, 2020, 33 pages.
Preliminary Ineligibility Contentions—U.S. Pat. No. 9,561,439 to Oono (19-00311) dated Apr. 7, 2020, 36 pages.
"Exhibit A-1—Preliminary Invalidity Contentions—U.S. Pat. No. 9,079,107 to Oono Based on U.S. Patent App. Pub. No. 2013/0005473 to Bethke et al. ("Bethke")" Supercell Oy, Apr. 7, 2020, 28 pages.
"Exhibit A-2—Preliminary Invalidity Contentions—U.S. Pat. No. 9,079,107 to Oono Based on U.S. Patent Publication No. 2011/0300926 to Englman et al. ("Englman")" Supercell Oy, Apr. 7, 2020, 43 pages.
"Exhibit A-3—Preliminary Invalidity Contentions—U.S. Pat. No. 9,079,107 to Oono Based on Forsaken World ("Forsaken World")" Supercell Oy, Apr. 7, 2020, 32 pages.
"Exhibit A-4—Preliminary Invalidity Contentions—U.S. Pat. No. 9,079,107 to Oono Based on Guild Wars 2 PC Game by NCSOFT (2012) ("GVV2 Game"), Guild Wars 2—Brady Games E-Guide (2012) ("GW2 Guide"), Guild Wars 2 Wiki (Aug. 31, 2012) (https://web.archive.org/web/20120831054429/https://wiki.guildwars2.com/wiki/Guild_Wars_2) ("GW2W"), Frequently Asked Questions—Guild Wars 2 Wiki (Aug. 31, 2012) (https://web.archive.org/web/20120828073714/http://wiki.guildwars2.com/wiki/Frequently_Asked_Questions) ("FAQ"), and Guild Wars 2—Quick Reference Card (2012) ("GW2 Card") (collectively, "Guild Wars 2")" Supercell Oy, Apr. 7, 2020, 128 pages.
"Exhibit A-5—Preliminary Invalidity Contentions—U.S. Pat. No. 9,079,107 to Oono Based on U.S. Patent App. Pub. No. 2012/0157212 to Kane et al. ("Kane")" Supercell Oy, Apr. 7, 2020, 26 pages.

(56) References Cited

OTHER PUBLICATIONS

"Exhibit A-6—Preliminary Invalidity Contentions—U.S. Pat. No. 9,079,107 to Oono Based on U.S. Patent App. Pub. No. 2006/0003824 to Kobayashi et al. ("Kobayashi")" Supercell Oy, Apr. 7, 2020, 28 pages.
"Exhibit A-7—Preliminary Invalidity Contentions—U.S. Pat. No. 9,079,107 to Oono Based on U.S. Patent App. Pub. No. 2014/0024462 to Qiang et al. ("Qiang")" Supercell Oy, Apr. 7, 2020, 22 pages.
"Exhibit A-8—Preliminary Invalidity Contentions—U.S. Pat. No. 9,079,107 to Oono Based on U.S. Patent App. Pub. No. US2013/0190094 to Ronen et al. ("Ronen")" Supercell Oy, Apr. 7, 2020, 25 pages.
"Exhibit A-9—Preliminary Invalidity Contentions—U.S. Pat. No. 9,079,107 to Oono Based on Warhammer Online: Age of Reckoning PC Game (2008) ("Warhammer PC"), Warhammer Online: Age of Reckoning—Prima Official Game Guide (2008) ("Warhammer Guide"), "Warhammer Online—My Guild, My Everything!" (Jun. 7, 2008) (https://war.jeuxonline.info/article/5099/my-guild-myeverything) ("Warhammer My Guild"), and "Warhammer Online: Age of Reckoning—Getting to Know Guild Ranks 1-5" (Apr. 21, 2009) (https://www.mmorpg.com/warhammer-online-age-of-reckoning/guides/getting-to-know-guild-ranks-1-5-2000116751) ("Warhammer Guild Ranks") (collectively, "Warhammer Online")" Supercell Oy, Apr. 7, 2020, 145 pages.
"Exhibit A-10—Preliminary Invalidity Contentions—U.S. Pat. No. 9,079,107 to Oono Based on World of Warcraft Game Manual (2004) ("WoW Manual"), World of Warcraft Cataclysm (2010) ("WoW Cataclysm Manual"), "Cataclysm Guide: Guild Advancement—Wowhead" (https://web.archive.org/web/20130212041229/https://www.wowhead.com/guide=cataclysm&guilds) ("Cataclysm Guide"), and "World of Warcraft—Guild Advancement and You" by Blizzard Entertainment (Jan. 21, 2011) (https://worldofwarcraft.com/en-us/news/2113741/guild-advancement-and-you) ("WoW Guild") (collectively, "WoW and WoW Cataclysm")" Supercell Oy, Apr. 7, 2020, 182 pages.
"Exhibit B-1—Preliminary Invalidity Contentions—U.S. Pat. No. 9,561,439 to Oono Based on U.S. Patent App. Pub. No. 2013/0005473 to Bethke et al. ("Bethke")" Supercell Oy, Apr. 7, 2020, 30 pages.
"Exhibit B-2—Preliminary Invalidity Contentions—U.S. Pat. No. 9,561,439 to Oono Based on U.S. Patent Pub. No. 2011/0300926 to Englman et al. ("Englman")" Supercell Oy, Apr. 7, 2020, 32 pages.
"Exhibit B-3—Preliminary Invalidity Contentions—U.S. Pat. No. 9,561,439 to Oono Based on Forsaken World ("Forsaken World")" Supercell Oy, Apr. 7, 2020, 37 pages.
Exhibit B-4—Preliminary Invalidity Contentions—U.S. Pat. No. 9,561,439 to Oono Based on Guild Wars 2 PC Game by NCSOFT (2012) ("GW2 Game"), Guild Wars 2—Brady Games E-Guide (2012) ("GW2 Guide"), Guild Wars 2 Wiki (Aug. 31, 2012) (https://web.archive.org/web/20120831054429/https://wiki.guildwars2.com/wiki/Guild_Wars_2) ("GW2W"), Frequently Asked Questions—Guild Wars 2 Wiki (Aug. 31, 2012) (https://web.archive.org/web/20120828073714/http://wiki.guildwars2.com/wiki/Frequently_Asked_Questions) ("FAQ"), and Guild Wars 2—Quick Reference Card (2012) ("GW2 Card") (collectively, "Guild Wars 2") Supercell Oy, Apr. 7, 2020, 154 pages.
"Exhibit B-5—Preliminary Invalidity Contentions—U.S. Pat. No. 9,561,439 to Oono Based on U.S. Patent App. Pub. No. 2012/0157212 to Kane et al. ("Kane")" Supercell Oy, Apr. 7, 2020, 28 pages.
"Exhibit B-6—Preliminary Invalidity Contentions—U.S. Pat. No. 9,561,439 to Oono Based on U.S. Patent App. Pub. No. 2006/0003824 to Kobayashi et al. ("Kobayashi")" Supercell Oy, Apr. 7, 2020, 28 pages.
"Exhibit B-7—Preliminary Invalidity Contentions—U.S. Pat. No. 9,561,439 to Oono Based on U.S. Patent App. Pub. No. 2014/002442 to Qiang et al. ("Qiang")" Supercell Oy, Apr. 7, 2020, 25 pages.
"Exhibit B-8—Preliminary Invalidity Contentions—U.S. Pat. No. 9,561,439 to Oono Based on U.S. Patent App. Pub. No. 2013/0190094 to Ronen et al. ("Ronen")" Supercell Oy, Apr. 7, 2020, 23 pages.
"Exhibit B-9—Preliminary Invalidity Contentions—U.S. Pat. No. 9,561,439 to Oono Based on Warhammer Online: Age of Reckoning PC Game (2008) ("Warhammer PC"), Warhammer Online: Age of Reckoning—Prima Official Game Guide (2008) ("Warhammer Guide"), "Warhammer Online—My Guild, My Everything!" (Jun. 7, 2008) (https://war.jeuxonline.info/article/5099/my-guild-myeverything) ("Warhammer My Guild"), and "Warhammer Online: Age of Reckoning—Getting to Know Guild Ranks 1-5" (Apr. 21, 2009) (https://www.mmorpg.com/warhammer-online-age-of-reckoning/guides/getting-to-know-guild-ranks-1-5-2000116751) ("Warhammer Guild Ranks") (collectively, "Warhammer Online")" Supercell Oy, Apr. 7, 2020, 148 pages.
"Exhibit B-10—Preliminary Invalidity Contentions—U.S. Pat. No. 9,561,439 to Oono Based on World of Warcraft Game Manual (2004) ("WoW Manual"), World of Warcraft Cataclysm (2010) ("WoW Cataclysm Manual"), "Cataclysm Guide: Guild Advancement—Wowhead" (https://web.archive.org/web/20130212041229/https://www.wowhead.com/guide=cataclysm&guilds) ("Cataclysm Guide"), and "World of Warcraft—Guild Advancement and You" by Blizzard Entertainment (Jan. 21, 2011) (https://worldofwarcraft.com/en-us/news/2113741/guild-advancement-and-you) ("WoW Guild") (collectively, "WoW and WoW Cataclysm")" Supercell Oy, Apr. 7, 2020, 171 pages.
Verified English Translation of Notice of Reasons for Rejection for corresponding JP 2013-049388, dated May 21, 2013, 5 pp.
Dai-Ranto!! Guild Battle G, FAMITSU mobage, vol. 2, Enterbrain Inc., Jul. 21, 2011, Weekly FAMITSU Aug. 25 extra edition, p. 62-63 (5pp.) (Refer to Notice of Reasons for Rejection dated May 21, 2013, regarding priority Japanese application No. 2013-049388 for relevance).
Chevalier Saga Tactics, [online], OnlineGamer ixll.Inc., posted on Aug. 17, 2012, searched on May 14, 2013, Internet <URL http://www.onlinegamer.jp/news/201208170038/>, 4 pp. (Refer to Notice of Reasons for Rejection dated May 21, 2013, regarding priority Japanese application No. 2013-049388 for relevance).
Office Action dated Jun. 7, 2016 in corresponding JP Application No. 2013-262855 including English translation, 11 pp.
Kizuna-no-Fantasia (Fantasia of ties), Biohazard outbreak survive, Sengoku Basara Mobile, Ys Nexus, Weekly FAMITSU, vol. 26, No. 28, Enterbrain Inc., Jun. 23, 2011, including English Translation, 4 pp.
Koji Fukuda, Why we got hooked on social games, 1$^{st}$ Edition, Softbank Creative Corp., Mitsutoshi Nitta, Sep. 11, 2011, (Reference describing well-known techniques), including English Translation, 19 pp.
Cailliet's blessing Angel Cailliet's wish, RINEAGE II, [Online], Jan. 1, 2013, [URL]: https://web.archive.org/web/20130101054625/https://event2.ncsoft.jp/1.0/lineage2/1212kaliel/.
ESTURK, Defeating within 15 turns, Dragon Quest 5 walk-through information center, [Online], Feb. 23, 2009, [URL]: https://web.archive.org/web/20090223150908/https://game-kouryaku.info/dq5/clear_15turn.html.
Japanese Office Action dated Mar. 12, 2019 in Patent Application No. 2018-065841, 11 pages (with unedited computer generated English translation).
Decision of Refusal issued in corresponding Japanese Application No. 2018-065841 dated Aug. 27, 2019 (with English translation).
Decision Denying Institution of Inter Partes Review 35 U.S.C. § 314; *Supercelloy, Petitioner*, vs. *GREE, Inc., Patent Owner*; IPR2020-01628; U.S. Pat. No. 9,561,439 B2; dated Feb. 17, 2021, 16 pages.
Decision Denying Institution of Inter Partes Review 35 U.S.C. § 314; *Supercelloy, Petitioner*, vs. *GREE, Inc., Patent Owner*; IPR2020-01633; U.S. Pat. No. 9,079,107 92; dated Feb. 19, 2021, 15 pages.
Supercell's Motion for Summary Judgement of Invalidity for Failure to Claim Patent Eligible Subject Matter Under 35 U.S.C. § 101 filed in Case No. 2:19-cv-0311-JRG-RSP on Dec. 14, 2020.
GREE, Inc.'s Motion to Strike Portions of Expert Report of Dr. Jose Zagal filed in Case No. 2:19-cv-0311-JRG-RSP on Dec. 15, 2020.

(56) References Cited

OTHER PUBLICATIONS

Supercell Oy's Opposition to Motion to Strike Portions of Expert Report of Dr. Jose Zagal filed in Case No. 2:19-cv-00311-JRG-RSP on Dec. 30, 2020.
GREE, Inc. 's Opposition to Motion for Summary Judgement of Invalidity for Failure to Claim Patent Eligible Subject Matter Under 35 U.S.C. § 101 filed in Case No. 2:19-cv-00311-JRG-RSP on Dec. 30, 2020.
GREE, Inc.'s Reply in Support of Its Motion to Strike Portions of Expert Report of Dr. Jose Zagal filed in Case No. 2:19-cv-00311-JRG-RSP on Jan. 6, 2021.
Supercell Oy's Reply in Support of Its Motion for Summary Judgement of Invalidity for Failure to Claim Patent Eligible Subject Matter Under 35 U.S.C. § filed in Case No. 2:19-cv-00311-JRG-RSP on Jan. 7, 2021.
Supercell Oy's Sur-Reply in Supoort of Its Opposition to Motion to Strike Portions of Expert Report of Dr. Jose Zagal filed in Case No. 2:19-cv-00311-JRG-RSP on Jan. 13, 2021.
GREE, Inc.'s Sur-Reply in Supoort of Its Opposition to Motion for Summary Judgement of Invalidity for Failure to Claim Patent Eligible Subject Matter Under 35 U.S.C. § filed in Case No. 2:19-cv-00311-JRG-RSP on Jan. 13, 2021.
Supercell's Opposed Motion for Leave to Amend Invalidity Contentions and Expert Reports filed in Case No. 2:19-cv-00311-JRG-RSP on Jan. 21, 2021.
GREE, Inc.'s Opposition to Opposed Motion for Leave to Amend Invalidity Contentions and Expert Reports filed in Case No. 2:19-cv-00311-JRG-RSP on Feb. 1, 2021.
Supercell Oy's Reply in Support of Its Opposed Motion for Leave to Amend Invalidity Contentions and Expert Reports filed in Case No. 2:19-cv-00311-JRG-RSP on Feb. 3, 2021.
GREE, Inc.'s Sur-Reply in Suport of Its Opposition to Opposed Motion for Leave to Amend Invalidity Contentions and Expert Reports filed in Case No. 2:19-cv-00311-JRG-RSP on Feb. 11, 2021.
Memorandum Order Motion to Strike Portions of Expert Report of Dr. jose Zagal filed in Case No. 2:19-cv-00311-JRG-RSP on Feb. 16, 2021.
Report and Recommendation Motion for Summary Judgement of Invalidity for Failure to Claim Patent Eligible Subject Matter Undrr 35 U.S.C. § 101 filed in Case No. 2:19-cv-00311-JRG-RSP on Apr. 16, 2021.
Supercell Oy's Objection to Report and Recommendation Denying Motion for Summary Judgement of Invalidity for Failure to Claim Patent Eligible Sublect Matter Under 35 U.S.C. § 101 filed in Case No. 2:19-cv-00311-JRG-RSP on Apr. 26, 2021.
Memorandum Order Opposed Motion for Leave to Ammend Invalidity Contentions and Expert Reports filed in Case No. 2:19-cv-00311-JRG-RSP on Apr. 26, 2021.
GREE, Inc.'s Objection to Report and Recommendation Granting Opposed Motion for Leave to Amend Invalidity Contentions and Expert Reports filed in Case No. 2:19-cv-00311-JRG-RSP on Apr. 28, 2021.

FIG. 3

| CARD ID | HP | ATTACK POWER | SPEED | SKILL |
|---|---|---|---|---|
| CARD 1 | 100 | 10 | 12 | SKILL 1 |
| CARD 2 | 120 | 15 | 8 | SKILL 2 |
| ⋮ | ⋮ | ⋮ | ⋮ | ⋮ |

FIG. 4

| ROBOT ID | HP | ATTACK POWER | SPEED | ATTRIBUTE |
|---|---|---|---|---|
| ROBOT 1 | 300 | 30 | 40 | INTERMEDIATE |
| ROBOT 2 | 290 | 25 | 50 | LONG |
| ROBOT 3 | 320 | 35 | 30 | SHORT |

FIG. 12

| USER ID | GUILD ID |
|---------|----------|
| USER 1  | GUILD 1  |
| USER 2  | GUILD 1  |
| ⋮       | ⋮        |

FIG. 13

| JEWEL TYPE | PIECE ID | APPEARANCE PROBABILITY |
|------------|----------|------------------------|
| JEWEL A    | A1~A6    | PROBABILITY 1          |
| JEWEL B    | B1~B6    | PROBABILITY 2          |
| JEWEL C    | C1~C6    | PROBABILITY 3          |
| JEWEL D    | D1~D6    | D1, D2 : PROBABILITY 1<br>D3, D4 : PROBABILITY 2<br>D5, D6 : PROBABILITY 3 |

FIG. 14

| USER ID | PIECE ID |
|---------|----------|
| USER 1  | D1       |
| USER 2  | D4       |
| ⋮       | ⋮        |

FIG. 15

| USER ID | LEVEL INFORMATION |
|---------|-------------------|
| USER 1  | 5                 |
| USER 2  | 25                |
| ⋮       | ⋮                 |

GAME CONTROL METHOD, GAME CONTROL DEVICE, AND RECORDING MEDIUM

CROSS REFERENCE TO RELATED APPLICATION

This application is a continuation of U.S. patent application Ser. No. 16/822,178, filed Mar. 18, 2020, which is a continuation of U.S. patent application Ser. No. 16/667,073, filed Oct. 29, 2019 (now U.S. Pat. No. 10,632,373, issued Mar. 12, 2020), which is a continuation of U.S. patent application Ser. No. 15/784,483, filed Oct. 16, 2017 (now U.S. Pat. No. 10,507,389, issued Dec. 17, 2019), which is a continuation of U.S. patent application Ser. No. 15/389,065, filed Dec. 22, 2016 (now U.S. Pat. No. 9,827,491, issued Nov. 28, 2017), which is a continuation of U.S. patent application Ser. No. 14/735,958, filed Jun. 10, 2015 (now U.S. Pat. No. 9,561,439, issued Feb. 7, 2017), which is a divisional of U.S. patent application Ser. No. 14/198,411, filed Mar. 5, 2014 (now U.S. Pat. No. 9,079,107, issued Jul. 14, 2015), which claims benefit of JP 2013-049388, filed on Mar. 12, 2013, JP 2013-202682, filed on Sep. 27, 2013 and JP 2013-262855, filed on Dec. 19, 2013. The entire contents of which are hereby incorporated by reference.

TECHNICAL FIELD

The present invention relates to a game control method, a game control device, and a recording medium.

BACKGROUND

In recent years, a social game is known which is provided on a social networking service (SNS) and which is played by a user while communicating with another user.

An application program for playing a social game is roughly divided into a native application that is downloaded to a communication terminal, installed on the communication terminal, and then used, and a web application that runs on a web server and is used by a web browser of the communication terminal.

The native application is an application that depends on the OS of a communication terminal, such as an iPhone (registered trademark) terminal and an Android (registered trademark) terminal of a smartphone. For example, a server device distributes a native application, such as an iPhone application by Objective-C or an Android application by Java (registered trademark), etc., from the platform to each communication terminal.

It is necessary to develop the native application by two kinds of programming languages, i.e., the programming language "Objective-C" compatible with iPhone terminals and the programming language "Java" compatible with Android terminals. Because of this, it is necessary to make the native application public through an official marketplace after subjecting the native application to coding processing using a language specific to the platform of communication terminals.

On the other hand, it is possible to cross-develop the web application for both of the platforms based on the languages, such as HTML5 (Hyper Text Markup Language 5), Javascript (registered trademark), and CSS3 (Cascading Style Sheets 3), and it is not necessary to make the web application public through an official marketplace at the time of disclosure. Further, the web application does not depend on the OS of the terminal.

Incidentally, among the above-mentioned social games, there is a social game in which it is possible to constitute a group referred to as a guild by a plurality of users (players) who play the game. In such a social game, it is possible to share or communicate information among a plurality of users (guild members) constituting the same guild.

Further, in a social game in which, for example, a user fights a battle with an enemy character using various kinds of characters, etc., possessed by the user, it is possible to fight a battle with, for example, an enemy character referred to as a raid boss with cooperation among the guild members. In the case where a user fights a battle with an enemy character with cooperation among the guild members and wins the battle, it is possible for the guild members to obtain various kinds of rewards (for example, characters, items, etc.).

SUMMARY

In the above-mentioned social game in which a user fights a battle with an enemy character with cooperation among the guild members, it is profitable for a user to constitute a guild, because it is possible to obtain, for example, rewards that cannot be obtained by one user, by constituting a guild.

However, the purpose of the guild in such a case is to win a battle, and therefore, the guild tends to consist of users at a high level (experts) in the social game. Further, the upper limit is set to the number of guild members in many cases.

Because of this, it is only possible for a user at a low level (beginner) to constitute a guild with users at about the same level as the user, and as a result, there is a possibility that a reward desired by the user cannot be obtained. Such circumstances cause the motivation for the game of a user at a low level to be reduced.

That is, for example, a new mechanism that enables a user to play in cooperation with a plurality of users (guild) regardless of the level, etc., is necessary in the social game.

An object of the present invention is to provide a game control method, a game control device, and a recording medium capable of providing a mechanism in which a plurality of users plays in cooperation with one another.

According to an aspect of the present invention, there is provided a game control method carried out by a game control device connected to a plurality of communication terminals used by each of a plurality of users who play a game so as to be capable of communicating therewith. The game control device has a storage unit for storing group information indicative of a group consisting of a plurality of users who play the game and game piece information indicative of a plurality of game pieces constituting one item. This game control method includes the steps of giving a game piece to each of the plurality of users in accordance with an operation of the user to a communication terminal used by the user, storing obtained game piece information indicative of the game piece given to each of the plurality of users in the storage unit, determining whether all of the plurality of game pieces necessary to constitute the one item indicated by the game piece information are given to a plurality of users constituting a group indicated by the group information based on the obtained game piece information stored in the storage unit, and giving a reward to a plurality of users constituting a group indicated by the group information in a case where it is determined that all of the plurality of game pieces are given.

According to the present invention, it is possible to provide a mechanism in which a plurality of users plays in cooperation with one another.

BRIEF DESCRIPTION OF THE DRAWINGS

Other features and advantages of the present optical device will be apparent from the ensuing description, taken in conjunction with the accompanying drawings, in which:

FIG. 3 illustrates an example of the data structure of card parameter information stored in the storage unit 42 illustrated in FIG. 2;

FIG. 4 illustrates an example of the data structure of robot parameter information stored in the storage unit 42 illustrated in FIG. 2;

FIG. 12 illustrates an example of the data structure of guild information stored in the storage unit 42;

FIG. 13 illustrates an example of the data structure of game piece information stored in the storage unit 42;

FIG. 14 illustrates an example of the data structure of obtained game piece information stored in the storage unit 42;

FIG. 15 illustrates an example of the data structure of level information stored in the storage unit 42;

DESCRIPTION

Hereinafter, with reference to the drawings, an embodiment of the present invention will be described.

Figure 1:
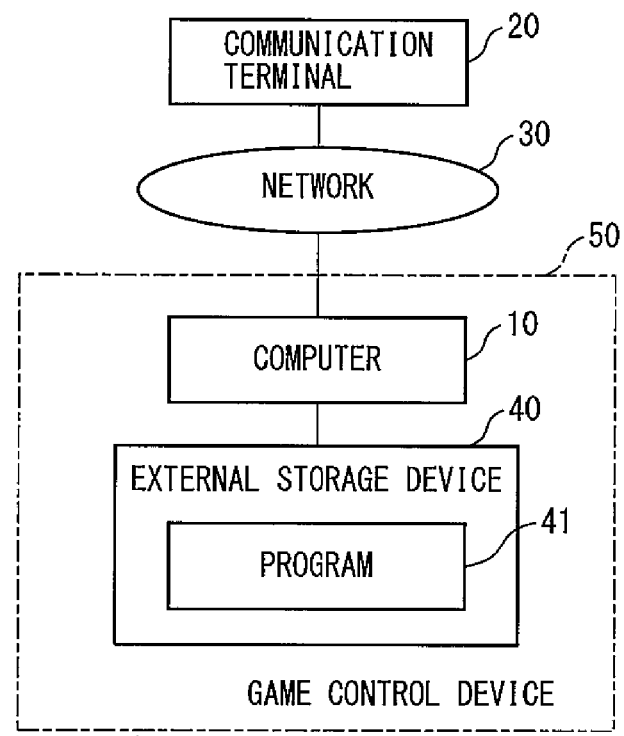
FIG. 1 is a block diagram illustrating a hardware configuration of a network system including a game control device according to an embodiment of the present invention.

FIG. 1 is a block diagram illustrating a hardware configuration of a network system (game control system) including a game control device according to the present embodiment.

The network system illustrated in FIG. 1 mainly includes a computer (server computer) 10 and a plurality of communication terminals 20 used by, for example, each of a plurality of users who play a social game. In FIG. 1, only one communication terminal 20 is illustrated for convenience.

The plurality of communication terminals 20 is connected to the computer 10 so as to be capable of communicating therewith via a network 30, for example, such as the Internet.

It is possible to use, for example, a smartphone, a feature phone, a tablet terminal, etc., as the communication terminal 20 and it is assumed that the hardware configurations specific to the devices, the adopted OS, the installed application programs, etc., range widely.

The computer 10 is connected to an external storage device 40, such as a hard disk drive (HDD). The external storage device 40 stores a program 41 executed by the computer 10. The computer 10 and the external storage device 40 configure a game control device 50.

The game control device 50 according to the present embodiment has a function for providing a card battle game (social game) using, for example, card characters as game elements, such as various kinds of characters, to a user via the communication terminal 20. In the card battle game in the present embodiment, it is possible for a user to fight a battle via the communication terminal 20 with an enemy character, such as a non-player character (NPC), by combining a plurality of card characters possessed by the user. Further, in the card battle game in the present embodiment, a mechanism in which the game is played with cooperation among a plurality of users is provided, as will be described later.

It is assumed that the card battle game in the present embodiment runs on the game control device (web server) 50 and is implemented by the web application used by the web browser of the communication terminal 20.

Figure 2:
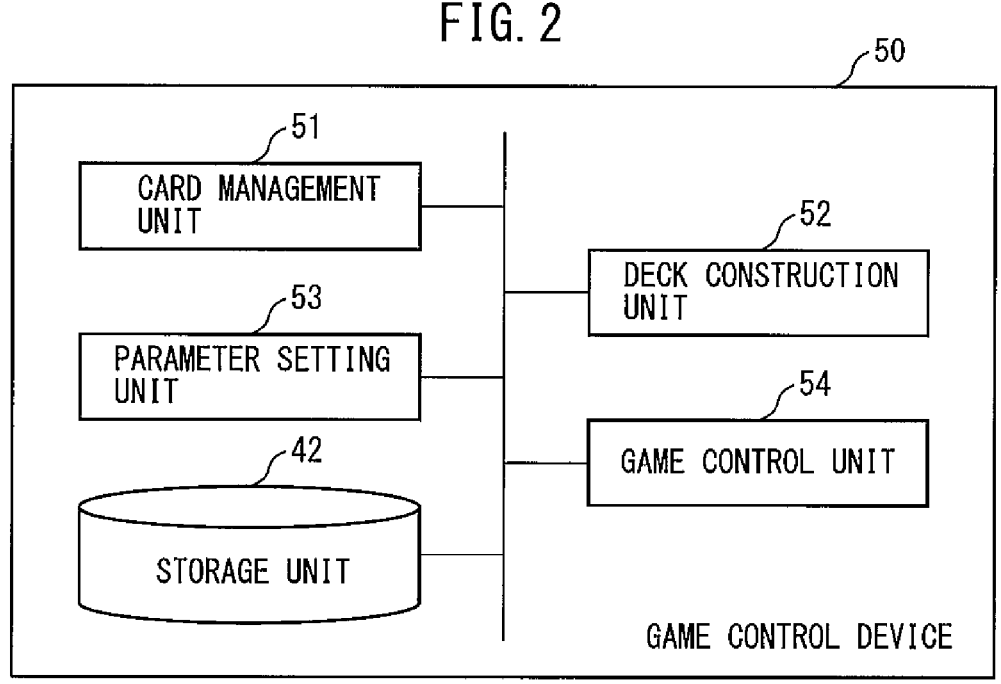
FIG. 2 is a block diagram illustrating a configuration of the main functions of the game control device 50 illustrated in FIG. 1.

FIG. 2 is a block diagram illustrating a configuration of the main functions of the game control device 50 illustrated in FIG. 1. As illustrated in FIG. 2, the game control device 50 includes a card management unit 51, a deck construction unit 52, a parameter setting unit 53, and a game control unit 54. In the present embodiment, it is assumed that each of these units is implemented by the computer 10 illustrated in FIG. 1 executing the program 41 stored in the external storage device 40. It is possible to distribute the program 41 by storing in advance in a computer readable recording medium. Further, the program 41 may be downloaded to the computer 10 via the network 30.

Further, the game control device 50 includes a storage unit 42. In the present embodiment, the storage unit 42 is accommodated, for example, in the external storage device 40.

The card management unit 51 has a function for giving various kinds of card characters and items used in the above-mentioned card battle game to a user who plays the card battle game in accordance with the progress of the card battle game. It is assumed that to the card characters given by the card management unit 51 (i.e., card characters possessed by the user), parameters are set in advance. Further, the card management unit 51 has a function for managing the (information on the) card characters, items, etc., possessed by the user.

The deck construction unit 52 selects a plurality of card characters (first characters) possessed by a user in accordance with the user's operation to the communication terminal 20. The deck construction unit 52 constructs a deck of the user who plays the card battle game, by using the selected plurality of card characters and robot characters (second characters possessed by the user) different from the card characters. In other words, the deck constructed by the deck construction unit 52 includes a plurality of card characters and robot characters.

The robot character is a game element given to a user in advance when, for example, the user plays the card battle game. It is assumed that, to the robot character, parameters are set in advance similarly to the above-mentioned card character.

The parameter setting unit 53 determines the parameters of the robot character based on the parameters set to the plurality of card characters and robot characters included in the deck constructed by the deck construction unit 52. The parameters set by the parameter setting unit 53 are set as the parameters for a robot battle of the robot character.

The game control unit 54 has a function for receiving operation information indicative of, for example, various kinds of operations of a user to the communication terminal 20 from the communication terminal 20 and to control the entire progress of the card battle game based on the operation information, etc.

Further, at the time of a battle between the robot character to which the above-mentioned robot battle parameters are set and an enemy character (hereinafter, referred to as a robot battle), the game control unit 54 controls the battle between the robot character and the enemy character based on the robot battle parameters and the parameters set to the enemy character. In this case, the game control unit 54 generates an image for displaying the effect of the robot battle and the outcome of the robot battle (hereinafter, referred to as a robot battle image). The robot battle image generated by the game control unit 54 is displayed on the communication terminal 20 via the network 30.

Further, the game control unit 54 causes an event to occur for a group referred to as a guild consisting of a plurality of users to play with cooperation among the users in the group (hereinafter, referred to as a guild event). In the case where the guild event occurs, it is possible for the plurality of users constituting the guild to obtain various kinds of rewards (e.g., card character, item, etc.) by satisfying conditions determined in advance in the guild event.

In the storage unit 42, various kinds of information necessary to control (advance) the card battle game are stored. Specifically, in the storage unit 42, parameter information including the parameters set in advance to the various kinds of card characters used in the above-mentioned card battle game (hereinafter, referred to as card parameter information) and parameter information including the parameters set in advance to the robot characters (hereinafter, referred to as robot parameter information) are stored in advance. In the case where a new card character or robot character, etc., is added as a new game element of the card battle game, the parameter information, etc., stored in the storage unit 42 is updated.

Further, in the storage unit 42, guild information indicative of the above-mentioned guild consisting of a plurality of users (group information), information on guild events, information on card characters, items, etc., possessed by a user who plays the card battle game, and information on the user are stored.

FIG. 3 illustrates an example of the data structure of card parameter information stored in the storage unit 42 illustrated in FIG. 2.

As illustrated in FIG. 3, the card parameter information includes HP (hit point), attack power, speed, and (a parameter of) skill associated with a card ID. The card ID is an identifier for identifying the card character. The HP is a numerical value expressing resistance of the card character identified by the card ID against damage by the attack of an enemy character. When the HP becomes 0, for example, it is no longer possible to fight a battle and the user is defeated in the battle. The attack power is a numerical value expressing an ability related to the attack on an enemy character and affects damage inflicted on the enemy character. The speed is a numerical value that affects the order of attack, etc., for example, at the time of a battle with an enemy character. The skill brings about a predetermined effect in a battle with an enemy character and includes, for example, attack skill, defense skill, pre-attack skill, etc., as will be described later.

In the example illustrated in FIG. 3, the card parameter information includes the HP "100", the attack power "10", the speed "12", and the skill "skill 1" associated with the card ID "1". According to this, it is indicated that the HP of the card character identified by the card ID "1" is 100, the attack power is 10, the speed is 12, and the card character has the skill 1.

Similarly, the card parameter information includes the HP "120", the attack power "15", the speed "8", and the skill "skill 2" associated with the card ID "2". According to this, it is indicated that the HP of the card character identified by the card ID "2" is 120, the attack power is 15, the speed is 8, and the card character has the skill 2.

Explanation is given on the assumption that the card parameter information includes parameters of the HP, the attack power, the speed, and the skill; however, the card parameter information may include other parameters.

FIG. 4 illustrates an example of the data structure of robot parameter information stored in the storage unit 42 illustrated in FIG. 2.

As illustrated in FIG. 4, the robot parameter information includes HP, attack power, speed, and (a parameter of) attribute associated with a robot ID. The robot ID is an identifier for identifying the robot character. The HP, the attack power, and the speed are the same as those included in the above-described card parameter information, and therefore, detailed explanation thereof is omitted here. The attribute indicates the attribute allocated to the robot character identified by the robot ID and includes, for example, a long distance type, an intermediate distance type, a short distance type, etc.

In the example illustrated in FIG. 4, the robot parameter information includes the HP "300", the attack power "30", the speed "40", and the attribute "intermediate" associated with the robot ID "1". According to this, it is indicated that the HP of the robot character identified by the robot ID "1" is 300, the attack power is 30, the speed is 40, and the (attribute of the) robot character is the intermediate distance type.

Further, the robot parameter information includes the HP "290", the attack power "25", the speed "50", and the attribute "long" associated with the robot ID "2". According to this, it is indicated that the HP of the robot character identified by the robot ID "2" is 290, the attack power is 25, the speed is 50, and the (attribute of the) robot character is the long distance type.

Furthermore, the robot parameter information includes the HP "320", the attack power "35", the speed "30", and the attribute "short" associated with the robot ID "3". According to this, it is indicated that the HP of the robot character identified by the robot ID "3" is 320, the attack power is 35, the speed is 30, and the (attribute of the) robot character is the short distance type.

In the card battle game in the present embodiment, it is assumed that, for example, three kinds of robot characters (robot characters identified by the robot IDs "1" to "3") are prepared in advance, as illustrated in FIG. 4, and a robot character selected by a user is given to the user at the time of initial registration, etc., to the card battle game. Due to this, it is possible for the user to fight the above-mentioned robot battle in the card battle game in the present embodiment. It is possible to cause each of the three kinds of robot characters illustrated in FIG. 4 to have such characteristics that, for example, the attribute of the robot character is superior to one of the other two attributes; however, inferior to the other attribute.

In FIG. 3 and FIG. 4, among the pieces of information stored in the storage unit 42, the card parameter information and the robot parameter information are explained, and details of the other pieces of information will be described later.

Hereinafter, with reference to the flowchart in FIG. 5, an outline of the flow (main cycle) of the card battle game in the present embodiment is explained. The object of the card battle game in the present embodiment is, for example, to obtain a card (character and item) of high rarity value by searching for a search object (e.g., a planet, etc.) referred to as a chapter by a user (player). It is assumed that a quest is set in advance in the chapter.

When the card battle game in the present embodiment is started, on the communication terminal 20, a list of chapters that a user can search for is displayed.

It is possible for a user to select a chapter by operating the communication terminal 20 used by the user (step S1).

In the case where a chapter is selected by the user, a search image of the selected chapter is displayed on the communication terminal 20 and the quest set in the chapter is started (step S2).

When the quest is started, it is possible for the user to complete the quest by operating the communication terminal 20 (e.g., tap operation, etc.) (step S3). It is assumed that the conditions to complete the quest are set in advance.

In the case where a plurality of quests is set in the chapter selected by the user, the above-mentioned steps S2 and S3 are repeated for each of the quests.

In the case where all the quests set in the chapter selected by the user are completed, a robot battle with an enemy character (NPC) set in the chapter occurs (step S4). In the following explanation, the enemy character (NPC) that fights the robot battle is referred to as an enemy robot character for convenience and other enemy characters are referred to simply as enemy characters.

If the user wins the robot battle, it is possible for the user to complete the chapter selected by the user (step S5). In this case, a new chapter that the user can search for occurs (i.e., a new chapter is released).

In the case where instructions to end the card battle game are not given by the user (NO at step S6), it is possible for the user to search for (select) a new chapter by returning to the above-mentioned step S1.

On the other hand, in the case where instructions to end the card battle game are given by the user (YES at step S6), the card battle game is ended.

According to the card battle game in the present embodiment, the game advances by completing each of the above-mentioned chapters, and it is possible to obtain a card, etc., of higher rarity value.

Figure 6:
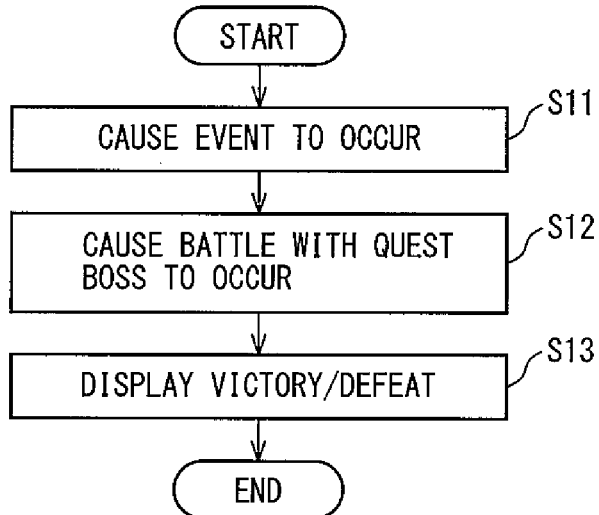
FIG. 6 is a flowchart illustrating the processing procedure of the game control device 50 in the case where a quest is started in the card battle game in the embodiment.

Next, with reference to the flowchart in FIG. 6, the processing procedure of the game control device 50 in the case where a quest is started in the card battle game in the present embodiment is explained.

As described above, when a quest is started, the game control unit 54 included in the game control device 50 causes an event in accordance with the quest to occur (step S11). Events that occur in a quest include, for example, a search event in which, by searching for a chapter, it is possible to obtain an experience value for increasing the level of (the character, etc., possessed by) the user, in-game currency and various kinds of cards (characters and items) that can be used in the card battle game, etc., and a battle event in which a battle with an enemy character in the quest is fought, etc. It is assumed that in the case of the victory over an enemy character in the battle event also, the experience value, the in-game currency, and the various kinds of cards can be obtained.

Depending on an event that occurs, a simple user's operation (e.g., tap operation, etc.) to the communication terminal 20 is requested. When the requested operation is performed by the user, the game control unit 54 advances the (quest of the) card battle game.

As described above, when an event occurs and the quest advances, a battle with the enemy character (quest boss) set in the quest occurs (step S12). The quest boss is a character having a higher ability (e.g., parameters of HP, attack power, etc.) than the enemy characters in the above-mentioned battle event.

It is assumed that the battle with an enemy character and the battle with the quest boss in the battle event described above are played by using, for example, one of the plurality of card characters (hereinafter, referred to as a leader card character) possessed by the user, different from the above-described robot battle. Specifically, the game control unit 54 controls the battle between the leader card character and an enemy character or between the leader card character and the quest boss, based on the parameters set to the leader card character and the parameters set to the enemy character or to the quest boss included in the parameter information stored in the storage unit 42.

The game control unit 54 displays the outcome of the battle with the quest boss (i.e., victory/defeat) on the communication terminal 20 (step S13).

If the user wins the victory against the quest boss, the quest is completed and a new quest occurs. When a plurality of quests is completed in this manner, a robot battle occurs as described above.

In the card battle game in the present embodiment, by combining one of a plurality of card characters (hereinafter, referred to as a base card character) possessed by the user with a card character (hereinafter, referred to as a combination card character) other than the base card character, it is possible to evolve (make more powerful) the base card character by combination.

Figure 7:
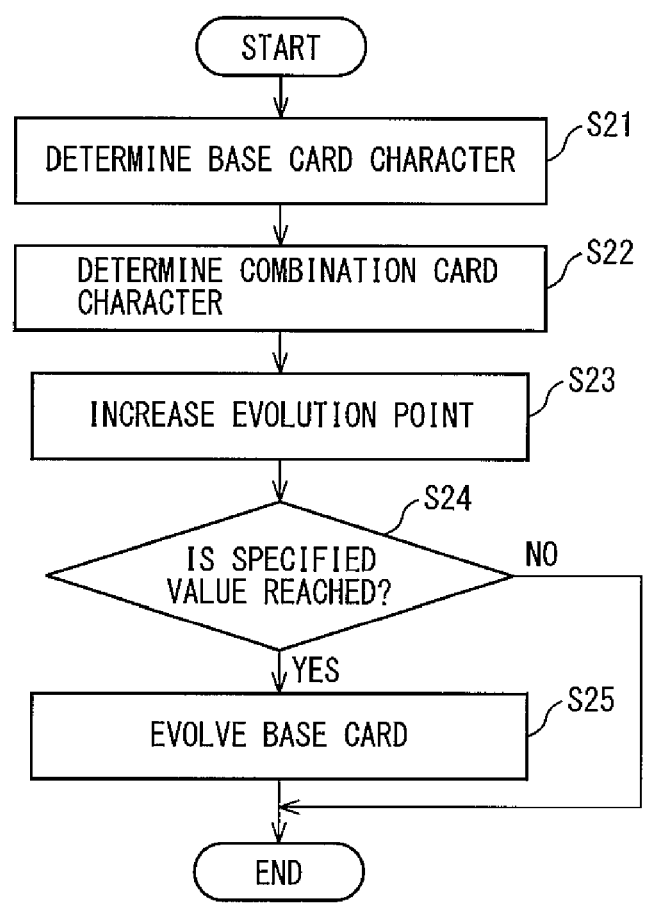
FIG. 7 is a flowchart illustrating the processing procedure of the game control device 50 at the time of evolving the card character by combination in the card battle game in the embodiment.

With reference to the flowchart in FIG. 7, the processing procedure of the game control device 50 at the time of evolving the card character by combination in the card battle game in the present embodiment is explained.

In this case, the game control unit 54 included in the game control device 50 displays a list of a plurality of card characters possessed by the user on the communication terminal 20. Due to this, it is possible for the user to select a base card from the list of the plurality of card characters possessed by the user by operating the communication terminal 20. The game control unit 54 determines a base card character in accordance with the operation of the user (step S21).

Further, it is possible for the user to select a combination card from the list of the plurality of card characters possessed by the user by operating the communication terminal 20. The game control unit 54 determines a combination card character in accordance with the operation of the user (step S22).

The game control unit 54 increases a point related to the evolution of the base card character (hereinafter, referred to as the evolution point) in accordance with, for example, the parameters, etc., set to the combination card character (step S23). It is assumed that the evolution point of the base card character is stored and managed in, for example, the storage unit 42. At this time, an increase in the evolution point is notified to the user by a gauge, etc., displayed on the communication terminal 20.

The game control unit 54 determines whether or not the evolution point of the base card character has reached a value specified in advance (hereinafter, referred to as the specified value) for the base card character (i.e., the evolution point is MAX) (step S24).

In the case where it is determined that the evolution point of the base card character has reached the specified value (YES at step S24), the game control unit 54 evolves the base card character (step S25). The parameters of the base card character having evolved in this manner are set higher compared to the parameters of the base card character before the evolution.

That is, in the card battle game in the present embodiment, by evolving the various kinds of cards by combination in such a manner, it is possible to advantageously advance the game in a robot battle with an enemy robot character, in a battle with an enemy character, etc.

On the other hand, in the case where it is determined that the evolution point of the base card character has not reached the specified value yet (NO at step S24), the processing at step S25 is not performed. In this case, the increased evolution point of the base card character is stored and managed in the storage unit 42, etc., and used in the next evolution of the base card character by combination.

At step S23 described above, in the case where, for example, the combination card character is the same as the base card character, the amount of an increase in the evolution point is set larger. Due to this, for example, it is possible to encourage the user to consume the same card character in order to evolve the card character of high rarity value, and therefore, it is made more likely that a card character of high rarity value is given to the user (i.e., it is possible to increase the probability of discharging a card of high rarity value). Further, by setting a card character (base card character) whose evolution point mentioned above is hard to reach the specified value and by designing the game so that the card character can be obtained only when the battle with a specific enemy character (e.g., a raid boss, etc., described later) is won, it is possible to encourage the user to fight a battle with the specific enemy character a number of times and thus to extend the width of the play of the card battle game.

Figure 8:
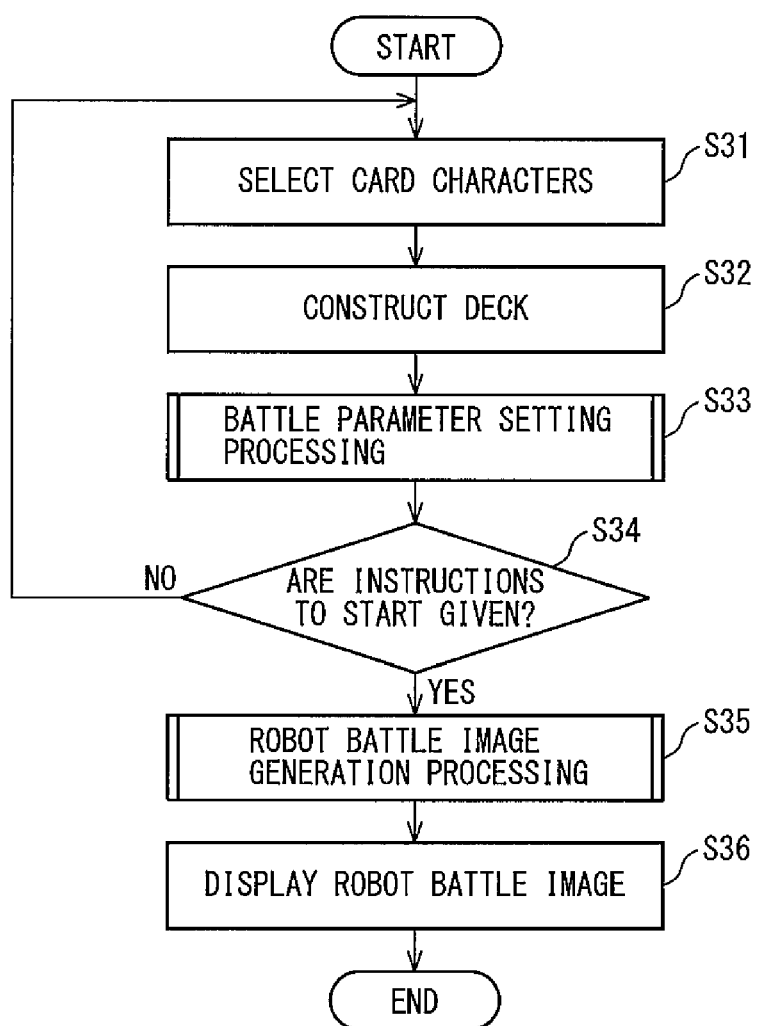
FIG. 8 is a flowchart illustrating the processing procedure of the game control device 50 when a robot battle occurs in the card battle game in the embodiment.

Next, with reference to the flowchart in FIG. 8, the processing procedure of the game control device 50 when a robot battle occurs in the card battle game in the present embodiment is explained.

In the case where the above-described robot battle occurs, on the communication terminal 20, a screen on which to construct a deck (hereinafter, referred to as a deck construction screen) is displayed. The deck is constructed by a plurality of card characters (e.g., five card characters) and a robot character. Consequently, a user performs an operation to specify five card characters from among the card characters possessed by the user on the deck construction screen displayed on the communication terminal 20. Operation information indicative of the operation performed by the user is transmitted from the communication terminal 20 to the game control device 50.

The deck construction unit 52 included in the game control device 50 selects five card characters in accordance with the operation of the user (the operation information transmitted from the communication terminal 20).

The deck construction unit 52 constructs a deck of the user using the five selected card characters and the robot character possessed by the user (step S32). Hereinafter, the robot character included in the deck constructed by the deck construction unit 52 is referred to as a deck robot character for convenience.

Next, the parameter setting unit 53 performs processing to set battle parameters on the constructed deck (deck robot character) (step S33). In the processing to set battle parameters, parameters for the robot battle (hereinafter, referred to as battle parameters) are set to the deck robot character. The battle parameters include the HP, the attack power, the speed, the skill, the attribute, etc., of the deck robot character. Details of the processing to set battle parameters will be described later.

The game control unit 54 determines whether or not instructions to start the robot battle are given by the user in accordance with the operation of the user to the communication terminal 20 (step S34). It is possible for the user to give instructions to start a robot battle by performing a tap operation on a robot battle start button, etc., displayed on the screen of the communication terminal 20.

In the case where it is determined that the instructions to start a robot battle are not given (NO at step S34), the procedure returns to the above-mentioned step S31 and the processing is repeated.

On the other hand, in the case where it is determined that the instructions to start a robot battle are given (YES at step S34), the game control unit 54 performs processing to generate the above-described robot battle image (step S35). In this processing to generate a robot battle image, the robot battle is controlled based on the battle parameters set to the deck robot character at step S33 and the parameters set in advance to the enemy robot character in the robot battle, and a robot battle image in accordance with the control is generated. The parameters set in advance to the enemy robot character include the HP, the attack power, the speed, the skill, the attribute, etc., of the enemy robot character as in the battle parameters set to the deck robot character.

The game control unit 54 displays the generated robot battle image on the communication terminal 20 (step S36).

In the case where the robot battle image is displayed in the card battle game, on the communication terminal 20, images representing the attack and defense between the deck robot character and the enemy robot character are automatically displayed sequentially, and an image representing the outcome (i.e., victory/defeat) of the robot battle is displayed finally. It is also possible to reduce the display time of the robot battle image and display only the image to represent the outcome of the robot battle, in accordance with the instructions of the user.

Figure 9:
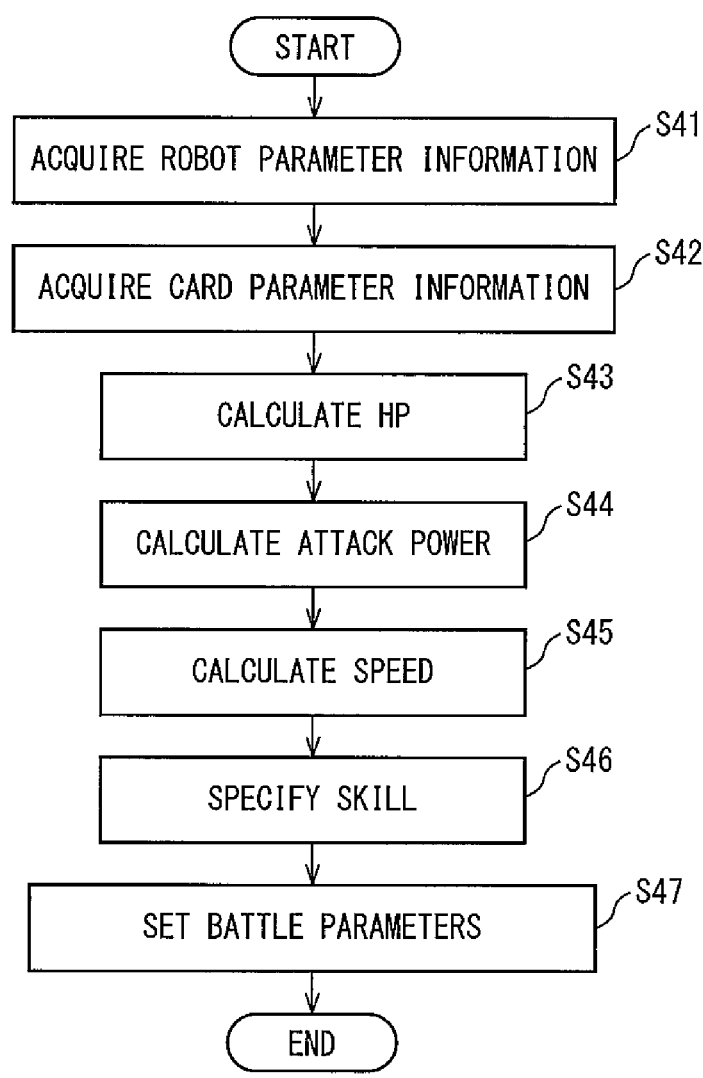
FIG. 9 is a flowchart illustrating the procedure of the processing to set battle parameters performed by the parameter setting unit 53.

Next, with reference to the flowchart in FIG. 9, the procedure of the above-described processing to set battle parameters (processing at step S33 illustrated in FIG. 8) is explained. The processing to set battle parameters is performed by the parameter setting unit 53 as described above.

In the processing to set battle parameters, the parameter setting unit 53 acquires parameter information (robot parameter information) including the parameters set in advance to the deck robot character (robot character included in the deck constructed by the deck construction unit 52) (step S41). The (parameters included in the) robot parameter information includes the HP, the attack power, the speed, and the attribute as described above.

Next, the parameter setting unit 53 acquires parameter information (card parameter information) including the parameters set in advance to each of a plurality of card characters (i.e., a plurality of card characters selected when the deck is constructed) included in the deck constructed by the deck construction unit 52 as described above (step S42). The (parameters included in the) card parameter information includes the HP, the attack power, the speed, and the skill as described above.

Although detailed explanation is omitted, in the storage unit 42, for example, information is stored (managed), which includes the robot ID for identifying the robot character, the card ID for identifying the card character, etc., possessed by the user in association with the user ID for identifying the user, and it is possible to acquire the robot parameter information and the card parameter information based on the robot ID and the card ID included in the information at steps S41 and S42.

The parameter setting unit 53 calculates the (parameter of the) HP included in the battle parameters set to the deck robot character, based on the HP included in the robot parameter information acquired at step S41 and the HP included in each piece of the card parameter information acquired at step S42 (step S43).

In this case, the parameter setting unit 53 calculates the total value of the HP included in the robot parameter information and the HP included in each piece of the card parameter information as the HP included in the battle parameters by adding the (parameter value of the) HP included in the robot parameter information and the (parameter value of the) HP included in each piece of the card parameter information.

Explanation is given on the assumption that the total value of the HP included in the robot parameter information and the HP included in each piece of the card parameter information is calculated as the HP included in the battle parameters; however, for example, attribute correction may be made for the HP included in each piece of the card parameter information. Specifically, although omitted in FIG. 3 described above, the card parameter information may include the attribute of the card character identified by the card ID included in the card parameter information, and in accordance with whether or not the attribute of the card character agrees with the attribute included in the robot parameter information (attribute of the deck robot character), the HP included in the card parameter information may be multiplied by an attribute correction value. In this case, the HP included in the battle parameters is calculated by "the sum total of the HP included in the robot parameter information+(the HP included in the card parameter information*the attribute correction value)". It is assumed that the attribute correction value in the case where the attribute of the card character agrees with the attribute of the deck robot character is a value greater than 1, which is the predetermined value, and the attribute correction value in the case where the attribute of the card character does not agree with the attribute of the deck robot character is 1. Due to this, it is possible for a user to increase the (value of the) HP included in the battle parameters by selecting a card character whose attribute is the same as the attribute of the robot character (deck robot character) possessed by the user when the deck is constructed.

Next, the parameter setting unit 53 calculates the (parameter of the) attack power included in the battle parameters set to the deck robot character, based on the attack power included in the robot parameter information acquired at step S41 and the attack power included in each piece of the card parameter information acquired at step S42 (step S44)

In this case, the parameter setting unit 53 calculates the total value of the attack power included in the robot parameter information and the attack power included in each piece of the card parameter information as the attack power included in battle parameters by adding the (parameter value of the) attack power included in the robot parameter information and the (parameter value of the) attack power included in each piece of the card parameter information.

Explanation is given on the assumption that the total value of the attack power included in the robot parameter information and the attack power included in each piece of the card parameter information is calculated as the attack power included in the battle parameters; however, as in the case of the HP described above, for example, attribute correction may be made for the attack power included in each piece of the card parameter information. Specifically, the card parameter information may include the attribute of the card character identified by the card ID included in the card parameter information and in accordance with whether or not the attribute of the card character agrees with the attribute included in the robot parameter information (attribute of the deck robot character), the attack power included in the card parameter information may be multiplied by an attribute correction value. In this case, the attack power of the battle parameters is calculated by "the sum total of the attack power included in the robot parameter information+(the attack power included in the card parameter information*the attribute correction value)". It is assumed that the attribute correction value in the case where the attribute of the card character agrees with the attribute of the deck robot character is a value greater than 1, which is the predetermined value, and the attribute correction value in the case where the attribute of the card character does not agree with the attribute of the deck robot character is 1. Due to this, it is possible for a user to increase the attack power included in the battle parameters by selecting a card character whose attribute is the same as the attribute of the robot character (deck robot character) possessed by the user when the deck is constructed.

Further, the parameter setting unit 53 calculates the (parameter of the) speed included in the battle parameters set to the deck robot character, based on the speed included in the robot parameter information acquired at step S41 and the speed included in each piece of the card parameter information acquired at step S42 (step S45).

In this case, the parameter setting unit 53 calculates the total value of the speed included in the robot parameter information and the speed included in each piece of the card parameter information as the speed included in the battle parameters by adding the (parameter value of the) speed included in the robot parameter information and the (parameter value of the) speed included in each piece of the card parameter information.

Explanation is given on the assumption that the total value of the speed included in the robot parameter information and the speed included in each piece of the card parameter information is calculated as the speed included in the battle parameters; however, as in the case of the HP and the attack power described above, for example, attribute correction may be made for the speed included in each piece of the card parameter information. Specifically, the card parameter information may include the attribute of the card character identified by the card ID included in the card parameter information and in accordance with whether or not the attribute of the card character agrees with the attribute included in the robot parameter information (attribute of the deck robot character), the speed included in the card parameter information may be multiplied by an attribute correction value. In this case, the speed included in the battle parameters is calculated by "the sum total of the speed included in the robot parameter information+(the speed included in the card parameter information*the attribute correction value)". It is assumed that the attribute correction value in the case where the attribute of the card character agrees with the attribute of the deck robot character is a value greater than 1, which is the predetermined value, and the attribute correction value in the case where the attribute of the card character does not agree with the attribute of the deck robot character is 1. Due to this, it is possible for a user to increase the (value of the) speed included in the battle parameters by selecting a card character whose attribute is the same as the attribute of the robot character (deck robot character) possessed by the user when the deck is constructed.

Next, the parameter setting unit 53 specifies the skill included in the battle parameters set to the deck robot character based on each piece of the card parameter information acquired at step S42 (step S46). In this case, the parameter setting unit 53 specifies all of the skills included in each piece of the card parameter information as the skills included in the battle parameters.

The parameter setting unit 53 sets the battle parameters including the HP calculated at step S43 described above, the attack power calculated at step S44, the speed calculated at step S45, and the skill specified at step S46 to the deck robot character (step S47).

In the case where attribute correction is made for the HP, the attack power, and the speed included in each piece of the card parameter information as described above and for example, in a special case where the attributes of all of the card characters agree with the attribute of the deck robot character, it is also possible to further increase the battle parameters (HP, attack power, and speed) set to the deck robot character and it is also possible to give a special skill (e.g., skill related to combo (combined attack or serial attack)) in accordance with a combination of the deck robot character and the card characters.

In the robot battle in the present embodiment, the processing to generate a robot battle image described above is performed based on the battle parameters set to the deck robot character in this manner and the parameters set to the enemy robot character.

Figure 10:
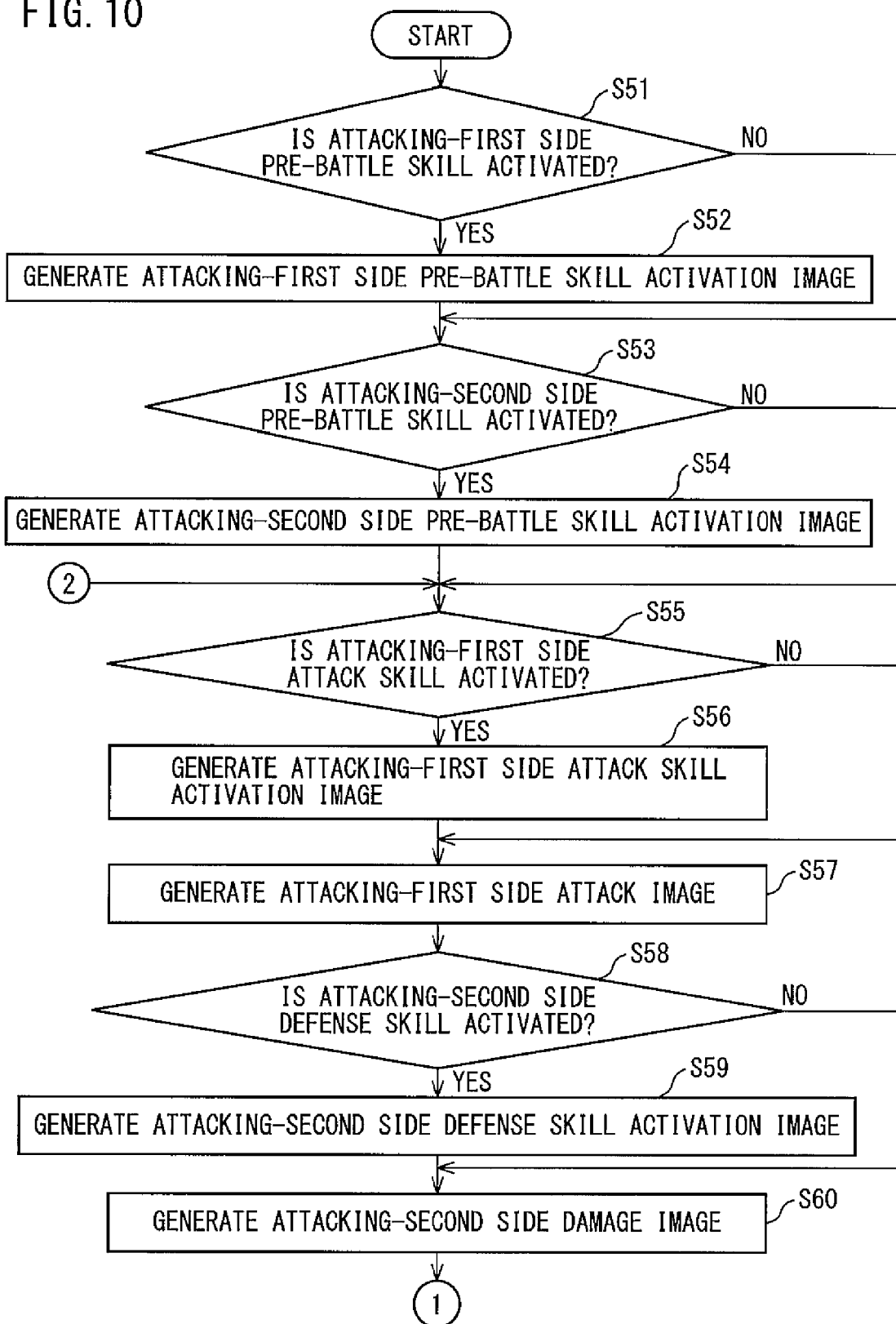
FIG. 10 is a flowchart illustrating the procedure of the processing to generate a robot battle image performed by the game control unit 54.
Figure 11:
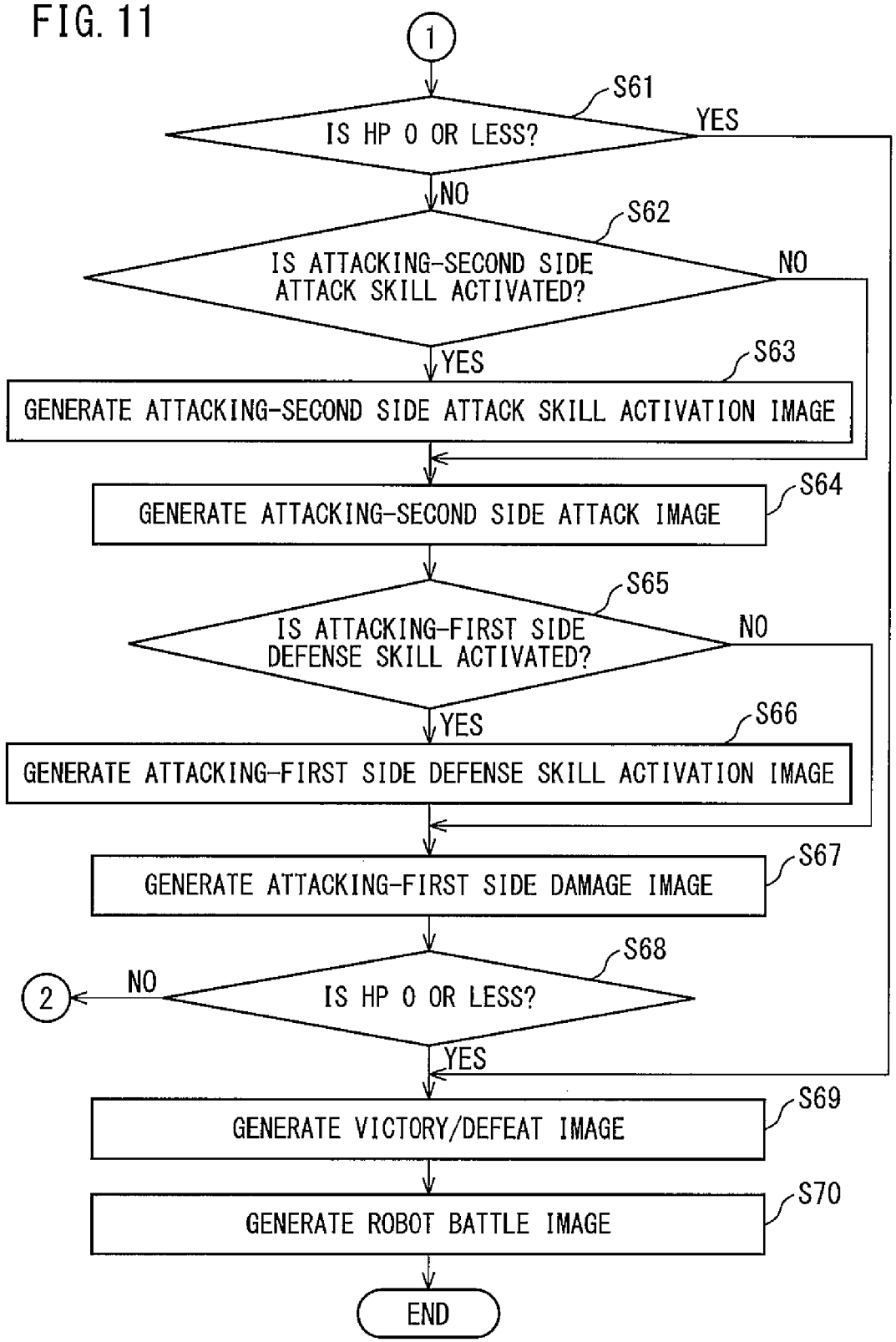
FIG. 11 is a flowchart illustrating the procedure of the processing to generate a robot battle image performed by the game control unit 54.

Next, with reference to the flowchart in FIG. 10 and FIG. 11, the procedure of the processing to generate a robot battle image (processing at step S35 illustrated in FIG. 8) is explained. The processing to generate a robot battle image is processing to control the robot battle between the deck robot character and the enemy robot character and to generate an image for displaying the effect and the outcome of the robot battle. The processing to generate a robot battle image is performed by the game control unit 54 as described above.

In the processing to generate a robot battle image, the game control unit 54 determines the attacking-first side and the attacking-second side in the robot battle. In this case, the game control unit 54 compares the speed included in the battle parameters set to the deck robot character (hereinafter, described simply as the deck robot character battle parameters) and the speed included in the parameters set to the enemy robot character (hereinafter, described simply as the enemy robot character parameters), and determines the side having the higher (parameter value of the) speed as the attacking-first side and the side having the lower speed as the attacking-second side. Explanation is given on the assumption that the deck robot character is determined as the attacking-first side and the enemy robot character as the attacking-second side.

The skills included in the deck robot character battle parameters and the enemy robot character parameters include attack skill, defense skill, and pre-battle skill.

The attack skill is activated at the time of attack by the robot character (deck robot character or enemy robot character) having the attack skill, and brings about an effect of, for example, increasing the (parameter value of the) attack power of its own during a predetermined period of time after the attack skill is activated. The defense skill is activated at the time of defense (i.e., when attacked by the opponent) by the robot character (deck robot character or enemy robot character) having the defense skill, and brings about an effect of, for example, reducing the (parameter value of the) attack power of the opponent in the robot battle during a predetermined period of time after the defense skill is activated. The pre-battle skill brings about an effect of increasing the attack power of its own or reducing the attack power of the opponent like the attack skill and the defense skill; however, different from the attack skill and the defense skill, the pre-battle skill is activated before the attack and defense (battle) is started in the robot battle and the effect lasts during the period of time of the robot battle. It is assumed that the activation timing and the activation probability are set to each of these skills.

In this case, based on the activation probability set to the pre-battle skill included in the deck robot character battle parameters (hereinafter, referred to as the attacking-first side pre-battle skill), the game control unit 54 determines whether or not to activate the attacking-first side pre-battle skill (step S51). In the case where a plurality of attacking-first side pre-battle skills exists, whether or not to activate the attacking-first side pre-battle skill is determined for each of the attacking-first side pre-battle skills.

In the case where it is determined that the attacking-first side pre-battle skill is activated (YES at step S51), the game control unit 54 generates an image representing the activation of the attacking-first side pre-battle skill (attacking-first side pre-battle skill activation image) (step S52). Further, the game control unit 54 reflects the effect produced by the attacking-first side pre-battle skill determined to be activated in the deck robot character battle parameters or in the enemy robot character parameters.

On the other hand, in the case where it is determined that the attacking-first side pre-battle skill is not activated (NO at step S51), the processing at step S52 is not performed.

Next, based on the activation probability set to the pre-battle skill included in the enemy robot character parameters (hereinafter, referred to as the attacking-second side pre-battle skill), the game control unit 54 determines whether or not to activate the attacking-second side pre-battle skill (step S52). In the case where a plurality of attacking-second side pre-battle skills exists, whether or not to activate the attacking-second side pre-battle skill is determined for each of the attacking-second side pre-battle skills.

In the case where it is determined that the attacking-second side pre-battle skill is activated (YES at step S53), the game control unit 54 generates an image representing the activation of the attacking-second side pre-battle skill (attacking-second side pre-battle skill activation image) (step S54). Further, the game control unit 54 reflects the effect produced by the attacking-second side pre-battle skill determined to be activated in the deck robot character battle parameters or in the enemy robot character parameters.

On the other hand, in the case where it is determined that the attacking-second side pre-battle skill is not activated (NO at step S53), the processing at step S54 is not performed.

Next, based on the activation probability set to the attack skill included in the deck robot character battle parameters (hereinafter, referred to as the attacking-first side attack skill), the game control unit 54 determines whether or not to activate the attacking-first side attack skill (step S55). In the case where a plurality of attacking-first side attack skills exists, whether or not to activate the attacking-first side attack skill is determined for each of the attacking-first side attack skills.

In the case where it is determined that the attacking-first side attack skill is activated (YES at step S55), the game control unit 54 generates an image representing the activation of the attacking-first side attack skill (attacking-first side attack skill activation image) (step S56). Further, the game control unit 54 reflects the effect produced by the attacking-first side attack skill determined to be activated in the (attack power included in the) deck robot character battle parameters.

On the other hand, in the case where it is determined that the attacking-first side attack skill is not activated (NO at step S55), the processing at step S56 is not performed.

The game control unit 54 generates an image representing the effect of the attack by the deck robot character (attacking-first side attack image) (step S57).

Next, based on the activation probability set to the defense skill included in the enemy robot character parameters (hereinafter, referred to as the attacking-second side defense skill), the game control unit 54 determines whether or not to activate the attacking-second side defense skill (step S58). In the case where a plurality of attacking-second side defense skills exists, whether or not to activate the attacking-second side defense skill is determined for each of the attacking-second side defense skills.

In the case where it is determined that the attacking-second side defense skill is activated (YES at step S58), the game control unit 54 generates an image representing the activation of the attacking-second side defense skill (attacking-second side defense skill activation image) (step S59). Further, the game control unit 54 reflects the effect produced by the attacking-second side defense skill determined to be activated in the (attack power included in the) deck robot character battle parameters.

On the other hand, in the case where it is determined that the attacking-second side defense skill is not activated (NO at step S58), the processing at step S59 is not performed.

The game control unit 54 generates an image representing the effect of damage inflicted on the enemy robot character (attacking-second side damage image) (step S60). In the processing at step S60, an image representing that the attack by the deck robot character has been avoided may be generated, based on the probability in accordance with the speed included in the enemy robot character parameters.

The game control unit 54 calculates damage (value) inflicted on the enemy robot character based on the attack power included in the deck robot character battle parameters. In this case, the damage inflicted on the enemy robot character may be changed appropriately in accordance with, for example, the attribute included in the deck robot character battle parameters, the attribute included in the enemy robot character parameters, etc.

The damage calculated by the game control unit 54 is subtracted from the (parameter value of the) HP included in the enemy robot character parameters. In the case where the image representing that the attack by the deck robot character has been avoided is generated at step S60 as described above, the damage inflicted on the enemy robot character is assumed to be 0.

Next, the game control unit 54 determines whether or not the HP from which the damage has been subtracted (hereinafter, described simply as enemy robot character's remaining HP) is 0 or less (step S61).

In the case where the enemy robot character's remaining HP is not 0 or less (NO at step S61), the enemy robot character's remaining HP is held within the game control unit 54.

Next, based on the activation probability set to the attack skill included in the enemy robot character parameters (hereinafter, referred to as the attacking-second side attack skill), the game control unit 54 determines whether or not to activate the attacking-second side attack skill (step S62). In the case where a plurality of attacking-second side attack skills exists, whether or not to activate the attacking-second side attack skill is determined for each of the attacking-second side attack skills.

In the case where it is determined that the attacking-second side attack skill is activated (YES at step S62), the game control unit 54 generates an image representing the activation of the attacking-second side attack skill (attacking-second side attack skill activation image) (step S63). Further, the game control unit 54 reflects the effect produced by the attacking-second side attack skill determined to be activated in the (attack power included in the) enemy robot character parameters.

On the other hand, in the case where it is determined that the attacking-second side attack skill is not activated (NO at step S62), the processing at step S63 is not performed.

The game control unit 54 generates an image representing the effect of the attack by the enemy robot character (attacking-second side attack image) (step S64).

Next, based on the activation probability set to the defense skill included in the deck robot character battle parameters (hereinafter, referred to as the attacking-first side defense skill), the game control unit 54 determines whether or not to activate the attacking-first side defense skill (step S65). In the case where a plurality of attacking-first side defense skills exists, whether or not to activate the attacking-first side defense skill is determined for each of the attacking-first side defense skills.

In the case where it is determined that the attacking-first side defense skill is activated (YES at step S65), the game control unit 54 generates an image representing the activation of the attacking-first side defense skill (attacking-first side defense skill activation image) (step S66). Further, the game control unit 54 reflects the effect produced by the attacking-first side defense skill determined to be activated in the (attack power included in the) enemy robot character parameters.

On the other hand, in the case where it is determined that the attacking-first side defense skill is not activated (NO at step S65), the processing at step S66 is not performed.

The game control unit 54 generates an image representing the effect of damage inflicted on the deck robot character (attacking-first side damage image) (step S67). In the processing at step S67, an image representing that the attack by the enemy robot character has been avoided may be generated, based on the probability in accordance with the speed included in the deck robot character parameters.

The game control unit 54 calculates damage (value) inflicted on the deck robot character based on the attack power included in the enemy robot character parameters. In this case, as described above, the damage inflicted on the deck robot character may be changed appropriately in accordance with, for example, the attribute included in the deck robot character battle parameters, the attribute included in the enemy robot character parameters, etc.

The damage calculated by the game control unit 54 is subtracted from the (parameter value of the) HP included in the deck robot character battle parameters. In the case where the image representing that the attack by the enemy robot character has been avoided is generated at step S67 as described above, the damage inflicted on the deck robot character is assumed to be 0.

Next, the game control unit 54 determines whether or not the HP from which the damage has been subtracted (hereinafter, described simply as deck robot character's remaining HP) is 0 or less (step S68).

In the case where it is determined that the deck robot character's remaining HP is not 0 or less (NO at step S68), the deck robot character's remaining HP is held within the game control unit 54, and the procedure is returned to the step S55 described above and the processing is repeated. In the subsequent processing, the damage calculated by the game control unit 54 is subtracted from the deck robot character's remaining HP or from the enemy robot character's remaining HP held within the game control unit 54 as described above. In other words, in the robot battle, the processing at step S55 and subsequent steps described above is repeated until either the deck robot character's remaining HP or the enemy robot character's remaining HP becomes 0 or less.

On the other hand, in the case where it is determined that the enemy robot character's remaining HP is 0 or less at step S61 described above, or in the case where it is determined that the deck robot character's remaining HP is 0 or less at step S68, the game control unit 54 generates an image representing the outcome (victory/defeat) of the robot battle (victory/defeat image) (step S69). In the case where it is determined that the enemy robot character's remaining HP is 0 or less, an image representing that the deck robot character has won is generated, and in the case where it is determined that deck robot character's remaining HP is 0 or less, an image representing that the deck robot character has been defeated is generated.

Next, the game control unit 54 generates a robot battle image for representing the effect and the outcome of the robot battle by combining each image generated in the processing described above (attacking-first side pre-battle skill activation image, attacking-second side pre-battle skill activation image, attacking-first side attack skill activation image, attacking-first side attack image, attacking-second side defense skill activation image, attacking-second side damage image, attacking-second side attack skill activation image, attacking-second side attack image, attacking-first side defense skill activation image, attacking-first side damage image, and victory/defeat image) so that the images changes in chronological order (step S70).

By displaying the robot battle image generated as described above on the communication terminal 20, it is possible for a user to view each effect of the robot battle and to check the outcome of the robot battle.

As described above, in the (main cycle of the) card battle game in the present embodiment, a user obtains various kinds of cards (character and item) by completing the chapter (quest), etc., and advances the story by completing a chapter with a higher level of difficulty using the obtained card(s).

Figure 5:
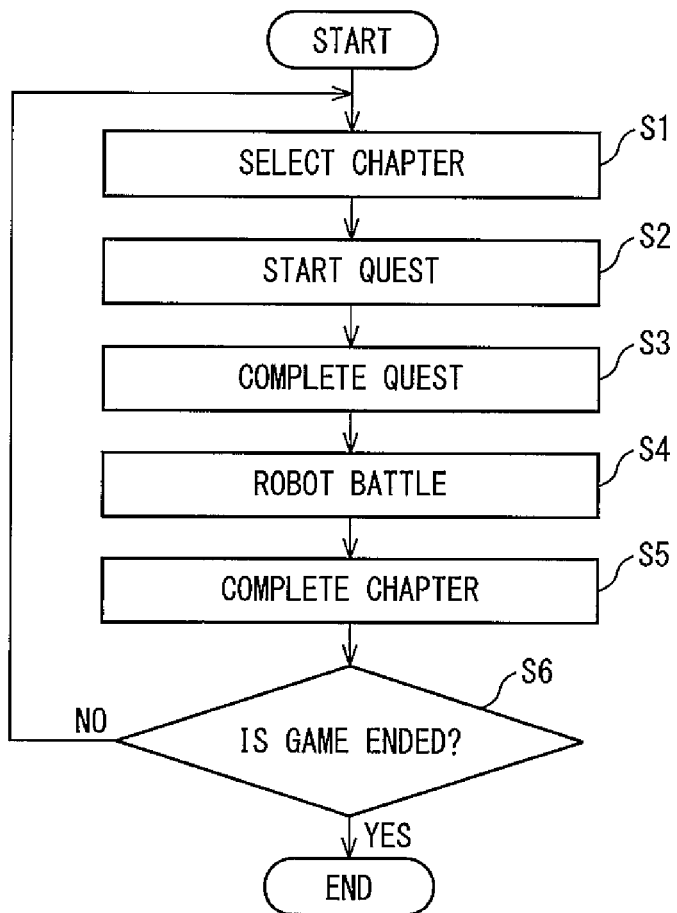
FIG. 5 is a flowchart for explaining an outline of the flow of the card battle game in the embodiment.

On the other hand, in the card battle game in the present embodiment, besides the main cycle explained in FIG. 5 described previously, there is provided a sub cycle including a mechanism (guild event) for a group (guild) including a plurality of users described above to play in cooperation with one another. It is assumed that the guild event occurs (takes place) periodically.

Hereinafter, the guild event is explained. The purpose of the guild event is to collect a plurality of game pieces constituting one item that appears in the card battle game by a plurality of users (guild members) constituting the guild in cooperation with one another. In the case where the guild satisfies predetermined conditions in the guild event, it is possible for the plurality of users constituting the guild to obtain various kinds of rewards. The rewards that can be obtained in the guild event include, for example, various kinds of card characters, items, etc.

The storage unit 42 included in the game control device 50 stores, as information on the guild event, guild information (group information), information on the guild event (hereinafter, referred to as game piece information), information on the card characters, items, etc., possessed by users who play the card battle game, and information on the users. The information on the card characters, items, etc., possessed by users who play the card battle game includes information on the game pieces obtained by the users in the guild event (hereinafter, referred to as obtained game piece information), etc., as well as information on the card characters, items, etc., possessed by the users. The information on the users includes level information, etc., for managing the levels of the users in the card battle game.

FIG. 12 illustrates an example of the data structure of guild information stored in the storage unit 42. The guild information is information indicative of the guilds constituted in the card battle game (groups each consisting of a plurality of users who play the game).

As illustrated in FIG. 12, the guild information includes user IDs and guild IDs associated with each other. The user ID is an identifier for identifying a user who plays the card battle game. The guild ID is an identifier for identifying the guild (group) to which the user identified by the associated user ID belongs.

In the example illustrated in FIG. 12, the guild information includes a user ID "user 1" and a guild ID "guild 1" associated with each other. Further, the guild information includes a user ID "user 2" and a guild ID "guild 1" associated with each other. According to this, it is indicated that the users identified by the user IDs "user 1" and "user 2" belong to the guild identified by the guild ID "guild 1".

Only the users identified by the user IDs "user 1" and "user 2" are explained for convenience; however, in the storage unit 42, the guild information on other users who play the card battle game is also stored similarly.

In the card battle game in the present embodiment, it is assumed that all of the users who play the card battle game belong to (join) any one of the guilds. Specifically, it is assumed that a user is encouraged to join an already-existing guild after the tutorial (explanation of how to play, etc.) given when the user plays the card battle game for the first time, and thereby it is possible for the user to join a guild specified by the user. It is also possible for a user to create a new guild by him/herself and to recruit other users. Further, as the condition to join a guild, it is also possible to require approval of the creator (leader) of the guild.

FIG. 13 illustrates an example of the data structure of game piece information stored in the storage unit 42. The game piece information is information indicative of game pieces collected in the guild event. It is assumed that in the guild event in the present embodiment, for example, it is possible to obtain a reward by a guild collecting a plurality of pieces (game pieces) constituting one jewel in cooperation with one another. It is also assumed that a plurality of types of jewels that can be collected is prepared in the guild event.

In this case, as illustrated in FIG. 13, the game piece information includes jewel types, piece IDs, and appearance probabilities associated with one another. The piece ID is an identifier for identifying each of a plurality of pieces constituting each jewel. The appearance probability indicates a probability with which the piece identified by the associated piece ID appears in the card battle game.

In the example illustrated in FIG. 13, the game piece information includes a jewel type "jewel A", piece IDs "A1 to A6", and an appearance probability "probability 1" associated with one another. According to this, it is indicated that the jewel A consists of six pieces identified by the piece IDs "A1 to A6" (hereinafter, referred to as the pieces A1 to A6) and the pieces A1 to A6 appear with the "probability 1" in the card battle game. The jewel A targets, for example, low-level users, and all of the pieces A1 to A6 are provided with a probability in common with which the pieces A1 to A6 are more likely to appear for low-level users (while they are playing). The low-level users are users whose levels are low in the card battle game. The range of the low-level users may be changed appropriately, and is assumed to be, for example, users having levels about 1 to 20. It may also be possible to cause the pieces A1 to A6 also to appear for users other than low-level users with a low probability or to prevent the pieces A1 to A6 from appearing for users other than low-level users.

Further, the game piece information includes a jewel type "jewel B", piece IDs "B1 to B6", and an appearance probability "probability 2" associated with one another. According to this, it is indicated that the jewel B consists of six pieces identified by the piece IDs "B1 to B6" (hereinafter, referred to as the pieces B1 to B6) and the pieces B1 to B6 appear with the "probability 2" in the card battle game. The jewel B targets, for example, intermediate-level users, and all of the pieces B1 to B6 are provided with a probability in common with which the pieces B1 to B6 are more likely to appear for intermediate-level users (while they are playing). The intermediate-level users are users whose levels are higher than those of the low-level users described above and lower than those of high-level users described later. The range of the intermediate-level users may be changed appropriately, and is assumed to be, for example, users having levels about 21 to 50. It may also be possible to cause the pieces B1 to B6 also to appear for users other than intermediate-level users with a low probability or to prevent the pieces B1 to B6 from appearing for users other than intermediate-level users.

Further, the game piece information includes a jewel type "jewel C", piece IDs "C1 to C6", and an appearance probability "probability 3" associated with one another. According to this, it is indicated that the jewel C consists of six pieces identified by the piece IDs "C1 to C6" (hereinafter, referred to as the pieces C1 to C6) and the pieces C1 to C6 appear with the "probability 3" in the card battle game. The jewel C targets, for example, high-level users, and all of the pieces C1 to C6 are provided with a probability in common with which the pieces C1 to C6 are more likely to appear for high-level users (while they are playing). The high-level users are users whose levels are high in the card battle game. The range of the high-level users may be changed appropriately, and is assumed to be, for example, users having levels about 51 or more. It may also be possible to cause the pieces C1 to C6 also to appear for users other than high-level users with a low probability or to prevent the pieces C1 to C6 from appearing for users other than high-level users.

Furthermore, the game piece information includes a jewel type "jewel D", piece IDs "D1 to D6", and appearance probabilities "D1, D2: probability 1", D3, D4: probability 2, D5, D6: probability 3" associated with one another. According to this, it is indicated that the jewel D consists of six pieces identified by the piece IDs "D1 to D6" (hereinafter, referred to as the pieces D1 to D6) and the pieces D1 and D2 appear with the "probability 1", the pieces D3 and D4 appear with the "probability 2", and the pieces D5 and D6 appear with the "probability 3". The jewel D targets all of the users (i.e., low-level users, intermediate-level users, and high-level users described above). Specifically, the pieces D1 and D2 are provided with a probability with which the pieces D1 and D2 are more likely to appear for low-level users. The pieces D3 and D4 are provided with a probability with which the pieces D3 and D4 are more likely to appear for intermediate-level users. The pieces D5 and D6 are provided with a probability with which the pieces D5 and D6 are more likely to appear for high-level users. As described above, different from the other jewels, the appearance probabilities of the jewel D are set so that each of the pieces constituting the jewel D (pieces D1 to D6) is given to users at levels in different ranges.

FIG. 14 illustrates an example of the data structure of obtained game piece information stored in the storage unit 42. The obtained game piece information is information indicative of game pieces obtained by users in a guild event (i.e., game pieces given to the users).

As illustrated in FIG. 14, the obtained game piece information includes user IDs and piece IDs associated with each other. The user ID is an identifier for identifying a user who plays the card battle game. The piece ID is an identifier for identifying a piece (game piece) obtained by the user identified by the associated user ID (a piece given to the user).

In the example illustrated in FIG. 14, the obtained game piece information includes a user ID "user 1" and a piece ID "D1" associated with each other. According to this, it is indicated that to the user identified by the user ID "user 1", the piece identified by the piece ID "D1" is given.

Further, the obtained game piece information includes a user ID "user 2" and a piece ID "D4" associated with each other. According to this, it is indicated that to the user identified by the user ID "user 2", the piece identified by the piece ID "D4" is given.

Only the users identified by the user IDs "user 1" and "user 2" are explained for convenience; however, in the storage unit 42, the obtained game piece information is also stored similarly for other users given a piece, which is a game piece.

FIG. 15 illustrates an example of the data structure of level information stored in the storage unit 42. The level information is information indicative of the level of a user who plays the card battle game.

As illustrated in FIG. 15, the level information includes user IDs and level information associated with each other. The user ID is an identifier for identifying the user who plays the card battle game. The level information indicates the level of the user identified by the associated user ID in the card battle game.

In the example illustrated in FIG. 15, the level information includes a user ID "user 1" and level information "5" associated with each other. According to this, it is indicated that the level of the user identified by the user ID "user 1" is 5.

Further, the level information includes a user ID "user 2" and level information "25" associated with each other. According to this, it is indicated that the level of the user identified by the user ID "user 2" is 25.

Only the users identified by the user IDs "user 1" and "user 2" are explained for convenience; however, in the storage unit 42, the level information is also stored similarly for other users who play the card battle game.

The level of a user in the card battle game increases in accordance with the progress of the card battle game, the victory in the battle, etc. In the case where the level of a user in the card battle game has increased as described above, the (level information included in the) level information stored in the storage unit 42 is updated each time.

Next, the operation of the game control device 50 when a guild event occurs in the present embodiment is explained. In this case, the game control device 50 performs processing to cause a guild event to occur and guild event management processing.

Figure 16:
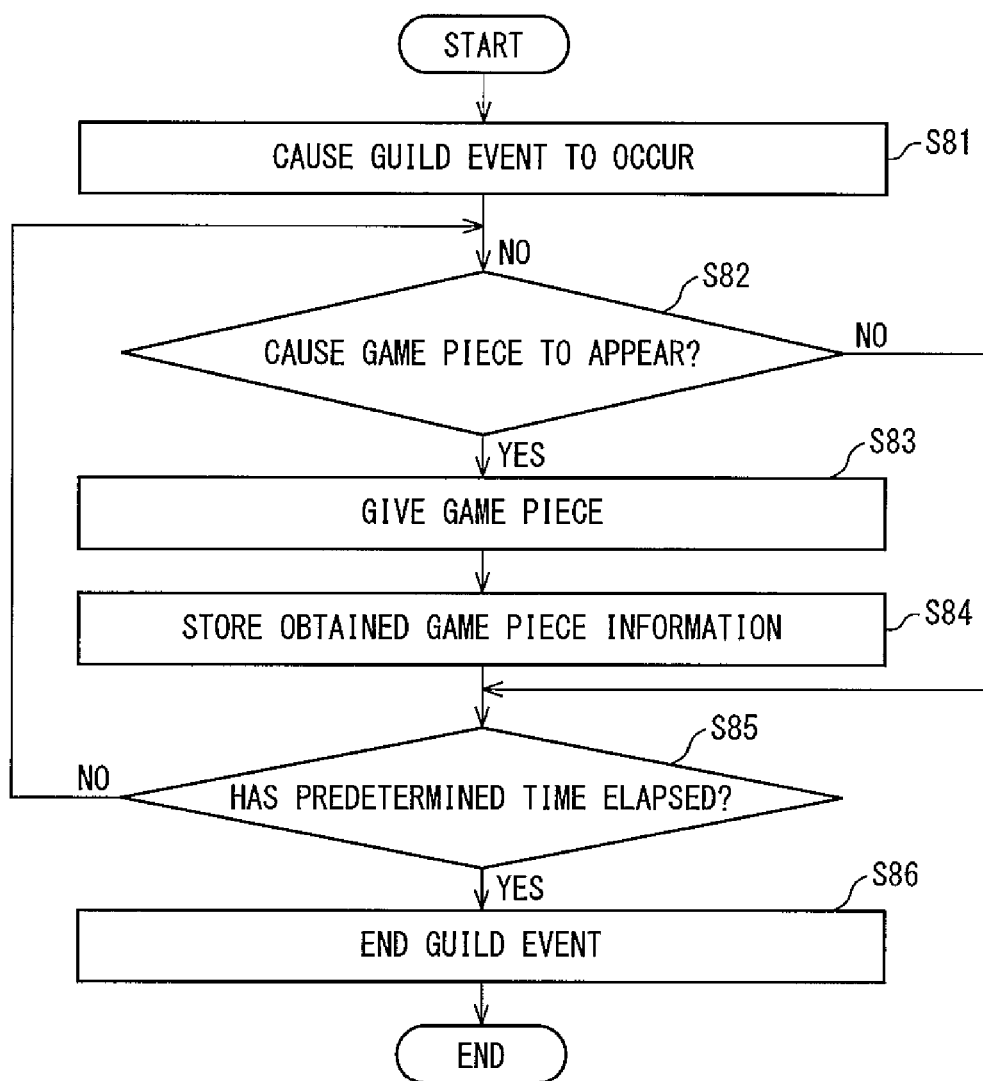
FIG. 16 is a flowchart illustrating the procedure of the processing to cause a guild event to occur performed by the game control device 50 according to the embodiment.

First, with reference to the flowchart in FIG. 16, the procedure of the processing to cause a guild event to occur performed by the game control device 50 according to the present embodiment is explained. This processing causes a guild event to occur and gives a game piece in the guild event to a user (player).

First, the game control unit 54 included in the game control device 50 causes a guild event to occur for giving a game piece (step S81). This guild event occurs, for example, periodically. Specifically, a guild event occurs, for example, at 7:00 as a morning event, at 12:00 as a daytime event, and at 22:00 as a night event. The period of time during which the guild event is taking place is notified to users who are playing the card battle game via the communication terminal 20. Hereinafter, a user playing the card battle game is referred to as a target user.

When a guild event occurs, the game control unit 54 determines whether or not to cause a game piece (piece constituting each jewel) to appear in accordance with the play contents of the card battle game of the target user (i.e., the operation by the target user to the communication terminal 20) (step S82). At this time, the game control unit 54 performs determination processing based on the appearance probability included in the game piece information and the level of the target user indicated by the level information stored in the storage unit 42.

It is assumed that the game pieces appear in a variety of scenes while the card battle game is being played. Specifically, the game pieces appear in a quest in the card battle game and at the time of victory over each enemy character (quest boss or enemy robot character).

In other words, the game control unit 54 determines whether or not to cause a game piece to appear based on the appearance probability in accordance with the level of the target user described above, in the case where the state of the play of the card battle game of the target user allows the game piece to appear.

In the case where it is determined to cause a game piece to appear (YES at step S82), the game control unit 54 generates an effect image in which the game piece appears (game piece appearance image) and displays the game piece appearance image on the communication terminal 20 used by the target user.

When the game piece appearance image is displayed on the communication terminal 20 in this manner, the game control unit 54 gives the game piece to the target user (step S83).

As described above, in the game piece information, the (levels of the) users to whom the game piece is more likely to be given are set for each game piece, and therefore, each game piece is given to users at levels in different ranges as a result.

In this case, the game control unit 54 generates obtained game piece information including a user ID for identifying a target user and a piece ID for identifying a game piece (piece) given to the target user associated with each other. The game control unit 54 stores the generated obtained game piece information in the storage unit 42 (step S84).

The game control unit 54 determines whether or not a predetermined period of time has elapsed after the guild event occurs at step S81 described above (step S85). As the predetermined period of time, for example, one hour, etc., is set.

In the case where it is determined that the predetermined period of time has elapsed (YES at step S85), the guild event is ended (step S86).

On the other hand, in the case where it is determined that the predetermined period of time has not elapsed yet (NO at step S85), the guild event is continued and the procedure returns to step S82 described above, and the processing is repeated. In other words, in the guild event in the present embodiment, for the period of time during which the guild event is taking place (i.e., for the period of time until the guild event is ended after the guild event occurs), it is possible to collect a plurality of game pieces.

In the case where it is determined that a game piece is not caused to appear at step S82, the game piece is not given to the target users and the processing at step 85 is performed.

In the case where it is determined that, for example, a plurality of game pieces appears based on the appearance probabilities at step S82, an effect image in which one of the plurality of game pieces appears may be displayed on the communication terminal 20, or an effect image in which the plurality of game pieces appears may be displayed on the communication terminal 20. In the case where the effect image in which the plurality of game pieces appears is displayed on the communication terminal 20, it may also be possible to give all of the game pieces to the target user or to give only one of the plurality of game pieces, which is selected by the target user.

Figure 17:
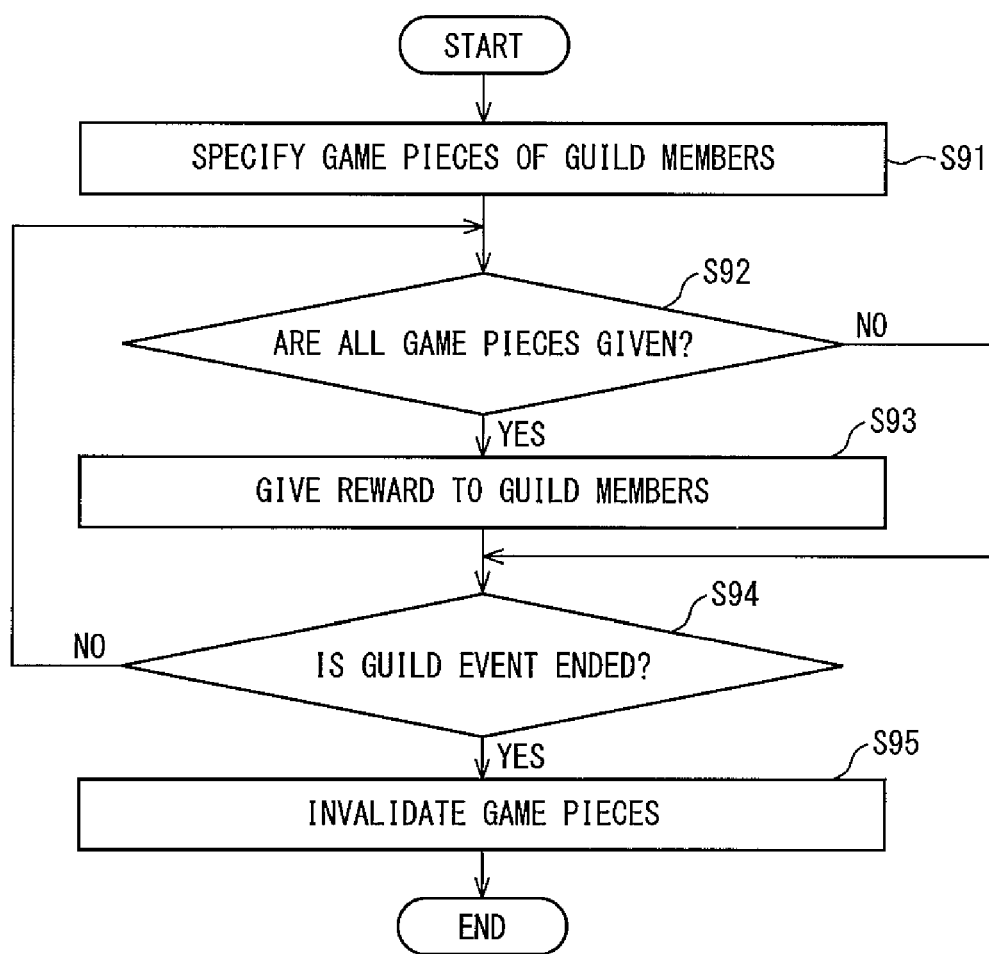
FIG. 17 is a flowchart illustrating the procedure of the guild event management processing performed by the game control device 50 according to the embodiment.

Next, with reference to the flowchart in FIG. 17, the procedure of the guild event management processing performed by the game control device 50 according to the present embodiment is explained. The guild event management processing is processing to manage the game pieces given to users for the period of time during which a guild event is taking place and to give rewards in the guild event to the users.

First, the game control unit 54 included in the game control device 50 specifies game pieces given to each of a plurality of users (guild members) constituting the guild (group) indicated by the guild information (group information) stored in the storage unit 42, based on the obtained game piece information stored in the storage unit 42.

In this case, the game control unit 54 acquires the guild information (group information) stored in the storage unit 42.

The game control unit 54 specifies all of the user IDs associated with the same guild ID in the acquired guild information. The users identified by the user IDs specified here are the users constituting the same guild. Hereinafter, the guild consisting of the users identified by the user IDs specified here is referred to as the target guild.

The game control unit 54 acquires the obtained game piece information including the specified user IDs from the storage unit 42.

The game control unit 54 specifies the pieces identified by the piece IDs included in the acquired obtained game piece information as the game pieces given to each of the users constituting the target guild.

Hereinafter, the game pieces specified by the game control unit 54 at step S91 are referred to as the obtained game pieces.

Next, the game control unit 54 determines whether or not all of the game pieces are given to the (plurality of users constituting the) target guild based on the obtained game pieces and the game piece information stored in the storage unit 42 (step S92).

The processing at step S92 is explained specifically with reference to FIG. 13 described above. In the case where all of the pieces identified by, for example, each of the piece IDs "A1 to A6" (six pieces constituting the jewel A) are included in the obtained game pieces, it is determined that all of the game pieces are given. In the case where all of the pieces identified by, for example, each of the piece IDs "B1 to B6" (six pieces constituting the jewel B) are included in the obtained game pieces, it is determined that all of the game pieces are given. Similarly, in the case where all of the pieces identified by, for example, each of the piece IDs "C1 to C6" (six pieces constituting the jewel C) are included in the obtained game pieces, it is determined that all of the game pieces are given. In the case where all of the pieces identified by, for example, each of the piece IDs "D1 to D6" (six pieces constituting the jewel D) are included in the obtained game pieces, it is determined that all of the game pieces are given.

In other words, at step S92, in the case where all of the pieces (i.e., one set of six pieces) constituting at least one (type of) jewel exist in the obtained game pieces, it is determined that all of the game pieces are given.

In the case where it is determined that all of the game pieces are given (YES at step S92), the game control unit 54 gives a reward in accordance with all of the given game pieces (i.e., the type of jewel whose pieces are all collected) to the plurality of users (guild members) constituting the target guild (step S93). In the case where a plurality of sets of game pieces is given (e.g., in the case where all of the pieces identified by the piece IDs "A1 to A6" and all of the pieces identified by the piece IDs "D1 to D6" are given), the reward is given for each (type) of the game pieces.

Next, whether or not the guild event is ended is determined (step S94). In the case where it is determined that the guild event is not ended yet (NO at step S94), the procedure returns to step S91 described above and the processing is repeated.

On the other hand, in the case where it is determined that the guild event is ended (YES at step S94), the game pieces given to the users in the guild event are invalidated (step S95). In this case, the game control unit 54 deletes the obtained game piece information stored in the storage unit 42.

In the case where the target guild collects all of the game pieces, it is also possible to give a ranking point to the target guild besides the reward described above. It is possible to totalize the ranking point given to the target guild for each predetermined period of time and to give various kinds of rewards to the plurality of users constituting the target guild in accordance with the total value of the ranking point. It is assumed that the ranking point is given also by the robot battle, etc., which do not occur during the guild event. Due to this, it is expected that each of a plurality of users constituting a target guild will positively play the card battle game in order to obtain the ranking point even for the period of time during which the guild event is not taking place. This ranking point may be managed, for example, in the storage unit 42, etc., for each guild.

The guild event management processing explained in FIG. 17 is performed for all of the guilds existing (created) in the card battle game.

As described above, in the present embodiment, to each of the users constituting a guild (group), a game piece is given in accordance with the operation of the user to the communication terminal 20 used by the user. The obtained game piece information indicative of the game pieces given to each of the users is stored in the storage unit 42. Based on the obtained game piece information stored in the storage unit 42, whether all of the game pieces (one set of game pieces) are given to the plurality of users constituting the guild indicated by the guild information (group information) is determined. In the case where it is determined that all of the game pieces are given, a reward is given to the plurality of users constituting the guild. Due to this, it is possible to provide a mechanism in which a plurality of users plays a social game in cooperation with one another.

Further, in the present embodiment, each of the game pieces indicated by the game piece information is given to users at levels in different ranges. Due to this, it is possible to encourage users to constitute a guild regardless of the levels, etc., instead of constituting a guild including, for example, only high-level users or only low-level users, and therefore, it is possible to provide a mechanism in which a chance to obtain the reward is given to all of the users.

Further, in the present embodiment, the reward is given in the case where all of the game pieces are given for the period of time during which the guild event is taking place, and the obtained game piece information is deleted in the case where the period of time has elapsed. Due to this, the reward can be obtained only by collecting all of the game pieces for the period of time during which the guild event is taking place, and therefore, it is possible to encourage a user to constitute a guild with users who play the card battle game, for example, in the same time zone as the user, and to play the game in cooperation with a larger number of users. Further, in the present embodiment, it may also be possible to display a screen for explaining the feature of a guild (the main play time zone of the users constituting the guild, etc.) on the communication terminal 20. By such a configuration, it is possible for a user to join a more appropriate guild, and therefore, it is possible for the user to obtain a reward in the guild, and it can be expected that the card battle game will be played continuously.

The explanation has been given on the assumption that the main cycle explained in FIG. 5 described previously and the sub cycle including a guild event are provided in the card battle game in the present embodiment. The sub cycle may further include a mechanism in which, for example, the robot battle is fought with another user (hereinafter, referred to as PvP), etc. Also in the PvP, it is possible to give the above-described ranking point and various kinds of rewards in accordance with the outcome. Further, it is also possible to obtain a game piece in the present embodiment from another user in accordance with the outcome of the PvP.

In a normal quest or a special quest, for example, it is also possible to cause to occur randomly a raid boss event in which a battle is fought with an enemy character referred to as a raid boss by borrowing a leader card character of another user, and, for example, a raid NPC event in which a robot battle (raid robot battle) is fought with an enemy robot character referred to as a raid robot character (raid NPC), in cooperation with a guild, etc.

By the raid boss event, it is possible to motivates a user to make friends in the card battle game by making it easier to borrow the leader card of a user registered, for example, as a friend, and therefore, to encourage the user to continuously play the game. Further, by causing the raid boss event to occur, it is possible to recognize the strength (i.e., parameters) of the card character (leader card character) of another user and at the same time, to know the existence of a new card character, the parameters thereof, etc. It is assumed that the user who lends the leader character to another user in the raid boss event is given a reward, such as a point used to obtain a card character, an item, etc., for example, in the card battle game.

In the case of the raid NPC event, it is also possible to for each user constituting a guild to fight a robot battle using the deck robot character of his/her own individually, and then to give the above-described ranking point to the guild in accordance with the outcome of the robot battle. Further, in the case of the defeat in the raid robot battle in the raid NPC event, it is also possible to ask another guild for help.

Although explanation has been given on the assumption that the card battle game in the present embodiment is implemented by a web application, the card battle game may be implemented by a native application that is downloaded to the communication terminal (terminal device) 20, installed on the communication terminal 20 and then used.

The present invention is not limited to the above-described embodiment as it is and it is possible to embody the embodiment by altering the components in the scope not deviating from the gist thereof in the stage of embodiment. Further, it is possible to form various kinds of inventions by appropriately combining the plurality of components disclosed in the above-described embodiment. For example, it may also be possible to delete some components from all of the components illustrated in the embodiments.

The invention claimed is:

1. A method for controlling a game implemented by a native application installed into a communication terminal, the method comprising:
receiving, from a first user, a first instruction to create a group;
creating the group in response to the first instruction;
receiving, from a second user, a second instruction for the second user to join to the group;
making, in response to the second instructions, the second user to belong to the group;
conducting a main cycle; and
conducting a sub cycle; wherein
the main cycle comprises:
displaying a deck creation screen;
creating, in response to a user operation to the deck creation screen, a deck including a plurality of card characters, wherein a plurality of parameters are set on each of the card characters, the plurality of parameters including a first parameter indicative of a hit point, a second parameter indicative of an attack power, and a third parameter indicative of speed;
conducting a card battle based on the plurality of parameters set on each of the plurality of card characters included in the deck; and
increasing, by elevating a first card character among the plurality of card characters by consuming at least one card character identical to the first card character, at least one of the plurality of parameters set on the first card character; and
the sub cycle comprises:
making an event to occur;
providing at least two component items;
providing, when users belonging to the group have all the component items necessary to obtain a benefit, the benefit to the users belonging to the group; and
finalizing the event after a first term lapses from an occurrence of the event.

2. The method of claim 1, further comprising determining a first time at which the event occurs, wherein making the event to occur comprises making the event to occur at the first time.

3. The method of claim 1, wherein the benefit is a card character available in the main cycle.

4. The method of claim 1, further comprising invalidating the component items in response to a finish of the event.

5. The method of claim 1, wherein the event is an event where users belonging to the group cooperate.

6. The method of claim 1, wherein making the second user to belong to the group comprises receiving approval from the first user after receiving the second instruction, and after which, making the second user to belong to the group.

7. The method of claim 1, wherein the card battle is a battle against a non-player character.

8. The method of claim 1, wherein the card battle is a battle where a plurality of users cooperate.

9. A server comprising a processor, the processor configured to:
provide a game, in which two or more users composing a group cooperate, implemented by a native application installed into a communication terminal,
in the game, the processor is further configured to:
receive, from a first user, a first instruction to create a group;
create the group in response to the first instruction;
receive, from a second user, a second instruction for the second user to join to the group;
make, in response to the second instructions, the second user to belong to the group;
conduct a main cycle; and
conduct a sub cycle; wherein
in the main cycle, the processor is configured to:
display a deck creation screen;
create, in response to a user operation to the deck creation screen, a deck including a plurality of card characters, wherein a plurality of parameters are set on each of the card characters, the plurality of parameters including a first parameter indicative of a hit point, a second parameter indicative of an attack power, and a third parameter indicative of speed;
conduct a card battle based on the plurality of parameters set on each of the plurality of card characters included in the deck; and
increase, by elevating a first card character among the plurality of card characters by consuming at least one card character identical to the first card character, at least one of the plurality of parameters set on the first card character; and in the sub cycle, the processor is configured to:
make an event to occur;
provide at least two component items;
provide, when users belonging to the group have all the component items necessary to obtain a benefit, the benefit to the users belonging to the group; and
finalize the event after a first term lapses from an occurrence of the event.

10. The server of claim 9, the processor further configured to determine a first time at which the event occurs, wherein making the event to occur comprises making the event to occur at the first time.

11. The server of claim 9, wherein the benefit is a card character available in the main cycle.

12. The server of claim 9, the processor further configured to invalidate the component items in response to a finish of the event.

13. The server of claim 9, wherein the event is an event where users belonging to the group cooperate.

14. The server of claim 9, wherein making the second user to belong to the group comprises receiving approval from the first user after receiving the second instruction, and after which, making the second user to belong to the group.

15. The server of claim 9, wherein the card battle is a battle against a non-player character.

16. The server of claim 9, wherein the card battle is a battle where a plurality of users cooperates.

17. A non-transitory computer-readable storage medium having stored thereon computer-executable instructions, which, when executed by a processor of a server, cause the processor to provide a game, in which two or more users composing a group cooperate, implemented by a native application installed into a communication terminal, in the game, the processor is further configured to:
receive, from a first user, a first instruction to create a group;
create the group in response to the first instruction;
receive, from a second user, a second instruction for the second user to join to the group;
make, in response to the second instructions, the second user to belong to the group;
conduct a main cycle; and
conduct a sub cycle; wherein
in the main cycle, the processor is configured to:
display a deck creation screen;
create, in response to a user operation to the deck creation screen, a deck including a plurality of card characters, wherein a plurality of parameters are set on each of the card characters, the plurality of parameters including a first parameter indicative of a hit point, a second parameter indicative of an attack power, and a third parameter indicative of speed;
conduct a card battle based on the plurality of parameters set on each of the plurality of card characters included in the deck; and
increase, by elevating a first card character among the plurality of card characters by consuming at least one card character identical to the first card character, at least one of the plurality of parameters set on the first card character; and in the sub cycle, the processor is configured to:
make an event to occur;
provide at least two component items;
provide, when users belonging to the group have all the component items necessary to obtain a benefit, the benefit to the users belonging to the group; and
finalize the event after a first term lapses from an occurrence of the event.

18. The non-transitory computer-readable storage medium of claim 17, the processor further configured to determine a first time at which the event occurs, wherein making the event to occur comprises making the event to occur at the first time.

19. The non-transitory computer-readable storage medium of claim 17, wherein the benefit is a card character available in the main cycle.

20. The non-transitory computer-readable storage medium of claim 17, the processor further configured to invalidate the component items in response to a finish of the event.

21. The non-transitory computer-readable storage medium of claim 17, wherein the event is an event where users belonging to the group cooperate.

22. The non-transitory computer-readable storage medium of claim 17, wherein making the second user to belong to the group comprises receiving approval from the first user after receiving the second instruction, and after which, making the second user to belong to the group.

23. The non-transitory computer-readable storage medium of claim 17, wherein the card battle is a battle against a non-player character.

24. The non-transitory computer-readable storage medium of claim 17, wherein the card battle is a battle where a plurality of users cooperates.

* * * * *